United States Patent
Hosseini et al.

(10) Patent No.: US 10,659,117 B2
(45) Date of Patent: May 19, 2020

(54) CODEBOOK RESTRICTION AND SUB-SAMPLING FOR CHANNEL STATE INFORMATION REPORTING

(71) Applicant: QUALCOMM Incorporated, San Diego, CA (US)

(72) Inventors: Seyedkianoush Hosseini, San Diego, CA (US); Amir Farajidana, Sunnyvale, CA (US); Achaleshwar Sahai, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/135,488

(22) Filed: Sep. 19, 2018

(65) Prior Publication Data

US 2019/0097698 A1    Mar. 28, 2019

Related U.S. Application Data

(60) Provisional application No. 62/562,091, filed on Sep. 22, 2017.

(51) Int. Cl.
*H04W 72/04* (2009.01)
*H04B 7/0456* (2017.01)
*H04B 7/06* (2006.01)

(52) U.S. Cl.
CPC ......... *H04B 7/0456* (2013.01); *H04B 7/0482* (2013.01); *H04B 7/0626* (2013.01);
(Continued)

(58) Field of Classification Search
CPC .. H04B 7/0456; H04B 7/0482; H04B 7/0626; H04W 72/042
See application file for complete search history.

(56) References Cited

U.S. PATENT DOCUMENTS

| | | | |
|---|---|---|---|
| 2015/0163029 A1* | 6/2015 | Murakami | H04L 27/2627 370/476 |
| 2017/0250743 A1* | 8/2017 | Jongren | H04B 7/0456 |
| 2019/0020396 A1* | 1/2019 | Wu | H04B 7/0626 |

FOREIGN PATENT DOCUMENTS

WO    WO-2017028007 A1    2/2017

OTHER PUBLICATIONS

Huawei, et al: "DMRS Based Open Loop Transmission," 3GPP Draft; R1-167676, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; Aug. 22, 2016-Aug. 26, 2016, Aug. 21, 2016, XP051126022, 6 pages, Retrieved from the Internet: URL: http://www.3gpp.org/ftp/Meetings_3GPP_SYNC/RAN1/Docs/ [retrieved on Aug. 21, 2016].

(Continued)

*Primary Examiner* — Wei Zhao
(74) *Attorney, Agent, or Firm* — Holland & Hart LLP

(57) ABSTRACT

Methods, systems, and devices for wireless communications are described. In some wireless communications systems, a base station may precode downlink signals to be transmitted to a user equipment (UE) using a precoding matrix. The precoding matrix may be selected by a UE from a number of precoding matrices (e.g., a codebook) and reported to the base station in a channel state information (CSI) report. As described herein, a base station may support techniques for limiting a number of precoding matrices that a UE may evaluate to identify a preferred precoding matrix to be indicated to the base station. In addition, the techniques described herein allow a base station to dynamically indicate an appropriate set of precoding matrices for the UE to evaluate based on the channel conditions at a given time.

30 Claims, 12 Drawing Sheets

(52) U.S. Cl.
CPC ......... *H04B 7/0632* (2013.01); *H04B 7/0639* (2013.01); *H04W 72/042* (2013.01); *H04B 7/0643* (2013.01); *H04B 7/0645* (2013.01)

(56) References Cited

OTHER PUBLICATIONS

International Search Report and Written Opinion—PCT/US2018/051933—ISA/EPO—dated Dec. 20, 2018.

\* cited by examiner though sub-sampling the codebook may reduce the latency associated with the CSI reporting process, it may also reduce the accuracy of the CSI reporting process. For instance, if the codebook is sub-sampled, the UE may not be able to identify the preferred precoding matrix from the full codebook. As such, it may be beneficial to provide a UE with a mechanism for identifying the preferred precoding matrix from a sub-sampled codebook.
CODEBOOK RESTRICTION AND SUB-SAMPLING FOR CHANNEL STATE INFORMATION REPORTING

CROSS REFERENCES

The present Application for patent claims the benefit of U.S. Provisional Patent Application No. 62/562,091 by HOSSEINI, et al., entitled "CODEBOOK RESTRICTION AND SUB-SAMPLING FOR CHANNEL STATE INFORMATION REPORTING," filed Sep. 22, 2017, assigned to the assignee hereof, and expressly incorporated by reference herein.

BACKGROUND

The following relates generally to wireless communication and more specifically to codebook restriction and sub-sampling for channel state information (CSI) reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be configured to report CSI to a base station. The base station may use the CSI to identify appropriate configurations for transmitting downlink signals to the UE. In one example, a UE may transmit a precoding matrix indicator (PMI) to the base station in a CSI report. The PMI may identify a preferred precoding matrix for the base station to use to precode downlink transmissions to the UE, and the UE may identify the preferred precoding matrix from a range of different precoding matrices (e.g., a codebook of precoding matrices). In some cases, the number of possible precoding matrices that the UE may evaluate to identify the preferred precoding matrix may be large. As a result, the latency associated with the CSI reporting process may be high, which may be detrimental to a wireless communications system.

SUMMARY

The described techniques relate to improved methods, systems, devices, or apparatuses that support codebook restriction and sub-sampling for channel state information (CSI) reporting. In some wireless communications systems, a base station may precode downlink signals to be transmitted to a user equipment (UE) using a precoding matrix. The precoding matrix may be selected by a UE from a number of precoding matrices (e.g., a codebook) and reported to the base station in a CSI report. As described herein, a base station may support techniques for limiting a number of precoding matrices that a UE may evaluate to identify a preferred precoding matrix to be indicated to the base station. In addition, the techniques described herein allow a base station to dynamically indicate an appropriate set of precoding matrices for the UE to evaluate based on the channel conditions at a given time.

A method for wireless communication at a UE is described. The method may include receiving, from a base station, an indication of a plurality of codebook sets, each codebook set including one or more precoding matrices for precoding downlink transmissions to the UE, identifying at least one set of the plurality of codebook sets to be evaluated for determining one or more preferred precoding matrices, evaluating the one or more precoding matrices in the at least one set to determine the one or more preferred precoding matrices, and transmitting, to the base station, a precoding matrix indicator (PMI) of the one or more preferred precoding matrices in a CSI report.

An apparatus for wireless communication at a UE is described. The apparatus may include means for receiving, from a base station, an indication of a plurality of codebook sets, each codebook set including one or more precoding matrices for precoding downlink transmissions to the UE, means for identifying at least one set of the plurality of codebook sets to be evaluated for determining one or more preferred precoding matrices, means for evaluating the one or more precoding matrices in the at least one set to determine the one or more preferred precoding matrices, and means for transmitting, to the base station, a PMI of the one or more preferred precoding matrices in a CSI report.

Another apparatus for wireless communication at a UE is described. The apparatus may include a processor, memory in electronic communication with the processor, and instructions stored in the memory. The instructions may be operable to cause the processor to receive, from a base station, an indication of a plurality of codebook sets, each codebook set including one or more precoding matrices for precoding downlink transmissions to the UE, identify at least one set of the plurality of codebook sets to be evaluated for determining one or more preferred precoding matrices, evaluate the one or more precoding matrices in the at least one set to determine the one or more preferred precoding matrices, and transmit, to the base station, a PMI of the one or more preferred precoding matrices in a CSI report.

A non-transitory computer-readable medium for wireless communication at a UE is described. The non-transitory computer-readable medium may include instructions operable to cause a processor to receive, from a base station, an indication of a plurality of codebook sets, each codebook set including one or more precoding matrices for precoding downlink transmissions to the UE, identify at least one set of the plurality of codebook sets to be evaluated for determining one or more preferred precoding matrices, evaluate the one or more precoding matrices in the at least one set to determine the one or more preferred precoding matrices, and transmit, to the base station, a PMI of the one or more preferred precoding matrices in a CSI report.

In some examples of the method, apparatus, and non-transitory computer-readable medium described above, identifying the at least one set of the plurality of codebook sets includes receiving a message indicating the at least one set of the plurality of codebook sets to be evaluated for determining the one or more preferred precoding matrices. Some examples of the method, apparatus, and non-transitory computer-readable medium described above may further include processes, features, means, or instructions for identifying the at least one set based at least in part on the message. In some examples of the method, apparatus, and non-transitory computer-readable medium described above, the message includes downlink control information (DCI) that indicates the at least one set of the plurality of codebook sets. In some examples of the method, apparatus, and non-transitory computer-readable medium described above, identifying the at least one set of the plurality of codebook sets includes determining the at least one set of the plurality of codebook sets based at least in part on one or more predetermined rules.

In some examples of the method, apparatus, and non-transitory computer-readable medium described above, identifying the at least one set of the plurality of codebook sets includes receiving control information in a transmission time interval (TTI) that triggers the UE to transmit the CSI report. Some examples of the method, apparatus, and non-transitory computer-readable medium described above may further include processes, features, means, or instructions for determining the at least one set based at least in part on an index of the TTI.

In some examples of the method, apparatus, and non-transitory computer-readable medium described above, identifying the at least one set of the plurality of codebook sets includes identifying a TTI in which to transmit the CSI report based at least in part on a configuration, at the UE, for periodic CSI reporting. Some examples of the method, apparatus, and non-transitory computer-readable medium described above may further include processes, features, means, or instructions for determining the at least one set based at least in part on an index of the TTI.

In some examples of the method, apparatus, and non-transitory computer-readable medium described above, identifying the at least one set of the plurality of codebook sets includes identifying a reference TTI to use to determine a TTI in which to transmit the CSI report based at least in part on a configuration, at the UE, for periodic CSI reporting. Some examples of the method, apparatus, and non-transitory computer-readable medium described above may further include processes, features, means, or instructions for determining the at least one set based at least in part on an index of the reference TTI.

In some examples of the method, apparatus, and non-transitory computer-readable medium described above, identifying the at least one set of the plurality of codebook sets includes receiving control information in a first TTI having a first duration that triggers the UE to transmit the CSI report, where the first TTI may be within a second TTI having a second duration. Some examples of the method, apparatus, and non-transitory computer-readable medium described above may further include processes, features, means, or instructions for determining the at least one set based at least in part on an index of the second TTI.

In some examples of the method, apparatus, and non-transitory computer-readable medium described above, identifying the at least one set of the plurality of codebook sets includes identifying a first TTI having a first duration in which to transmit the CSI report based at least in part on a configuration, at the UE, for periodic CSI reporting, where the first TTI may be within a second TTI having a second duration. Some examples of the method, apparatus, and non-transitory computer-readable medium described above may further include processes, features, means, or instructions for determining the at least one set based at least in part on an index of the second TTI.

In some examples of the method, apparatus, and non-transitory computer-readable medium described above, identifying the at least one set of the plurality of codebook sets includes identifying a reference TTI to use to determine a TTI in which to transmit the CSI report based at least in part on a configuration, at the UE, for periodic CSI reporting, where the reference TTI includes a first TTI having a first duration that may be within a second TTI having a second duration. Some examples of the method, apparatus, and non-transitory computer-readable medium described above may further include processes, features, means, or instructions for determining the at least one set based at least in part on an index of the second TTI.

In some examples of the method, apparatus, and non-transitory computer-readable medium described above, identifying the at least one set of the plurality of codebook sets includes receiving control information in a first TTI having a first duration that triggers the UE to transmit the CSI report, where the first TTI may be within a second TTI having a second duration. Some examples of the method, apparatus, and non-transitory computer-readable medium described above may further include processes, features, means, or instructions for determining the at least one set based at least in part on a first index of the first TTI and a second index of the second TTI.

In some examples of the method, apparatus, and non-transitory computer-readable medium described above, identifying the at least one set of the plurality of codebook sets includes identifying a first TTI having a first duration in which to transmit the CSI report based at least in part on a configuration, at the UE, for periodic CSI reporting, where the first TTI may be within a second TTI having a second duration. Some examples of the method, apparatus, and non-transitory computer-readable medium described above may further include processes, features, means, or instructions for determining the at least one set based at least in part on a first index of the first TTI and a second index of the second TTI.

In some examples of the method, apparatus, and non-transitory computer-readable medium described above, identifying the at least one set of the plurality of codebook sets includes identifying a reference TTI to use to determine a TTI in which to transmit the CSI report based at least in part on a configuration, at the UE, for periodic CSI reporting, where the reference TTI includes a first TTI having a first duration that may be within a second TTI having a second duration. Some examples of the method, apparatus, and non-transitory computer-readable medium described above may further include processes, features, means, or instructions for determining the at least one set based at least in part on a first index of the first TTI and a second index of the second TTI.

In some examples of the method, apparatus, and non-transitory computer-readable medium described above, receiving the indication of the plurality of codebook sets includes receiving the indication of the plurality of codebook sets via radio resource control (RRC) signaling. In some examples of the method, apparatus, and non-transitory computer-readable medium described above, a number of precoding matrices within each of the plurality of codebook sets may be based at least in part on an amount of time configured for the UE to generate and transmit CSI reports to the base station. In some examples of the method, apparatus, and non-transitory computer-readable medium described above, a number of precoding matrices within each of the plurality of codebook sets may be based at least in part on a periodicity with which the UE may be configured to transmit CSI reports to the base station. In some examples of the method, apparatus, and non-transitory computer-readable medium described above, a number of precoding matrices within each of the plurality of codebook sets may be based at least in part on a format of a control channel configured for the UE to use to transmit CSI reports to the base station.

In some examples of the method, apparatus, and non-transitory computer-readable medium described above, evaluating the one or more precoding matrices in the at least one set to determine the one or more preferred precoding matrices includes determining the one or more preferred precoding matrices based at least in part on long term channel properties of a channel to be used for downlink transmission to the UE. In some examples of the method, apparatus, and non-transitory computer-readable medium described above, evaluating the one or more precoding matrices in the at least one set to determine the one or more preferred precoding matrices includes determining the one or more preferred precoding matrices based at least in part on frequency selective short term channel properties of a channel to be used for downlink transmission to the UE. In some examples of the method, apparatus, and non-transitory computer-readable medium described above, the UE may be configured to transmit CSI reports to the base station periodically or aperiodically.

A method for wireless communication at a base station is described. The method may include transmitting, to a UE, an indication of a plurality of codebook sets, each codebook set including one or more precoding matrices for precoding downlink transmissions to the UE, indicating, to the UE, at least one set of the plurality of codebook sets for the UE to evaluate to determine one or more preferred precoding matrices, and receiving, from the UE, a PMI of the one or more preferred precoding matrices in a CSI report.

An apparatus for wireless communication at a base station is described. The apparatus may include means for transmitting, to a UE, an indication of a plurality of codebook sets, each codebook set including one or more precoding matrices for precoding downlink transmissions to the UE, means for indicating, to the UE, at least one set of the plurality of codebook sets for the UE to evaluate to determine one or more preferred precoding matrices, and means for receiving, from the UE, a PMI of the one or more preferred precoding matrices in a CSI report.

Another apparatus for wireless communication at a base station is described. The apparatus may include a processor, memory in electronic communication with the processor, and instructions stored in the memory. The instructions may be operable to cause the processor to transmit, to a UE, an indication of a plurality of codebook sets, each codebook set including one or more precoding matrices for precoding downlink transmissions to the UE, indicate, to the UE, at least one set of the plurality of codebook sets for the UE to evaluate to determine one or more preferred precoding matrices, and receive, from the UE, a PMI of the one or more preferred precoding matrices in a CSI report.

A non-transitory computer-readable medium for wireless communication at a base station is described. The non-transitory computer-readable medium may include instructions operable to cause a processor to transmit, to a UE, an indication of a plurality of codebook sets, each codebook set including one or more precoding matrices for precoding downlink transmissions to the UE, indicate, to the UE, at least one set of the plurality of codebook sets for the UE to evaluate to determine one or more preferred precoding matrices, and receive, from the UE, a PMI of the one or more preferred precoding matrices in a CSI report.

In some examples of the method, apparatus, and non-transitory computer-readable medium described above, indicating the at least one set of the plurality of codebook sets includes transmitting a message indicating the at least one set of the plurality of codebook sets for the UE to evaluate to determine the one or more preferred precoding matrices. In some examples of the method, apparatus, and non-transitory computer-readable medium described above, the message includes DCI that indicates the at least one set of the plurality of codebook sets.

In some examples of the method, apparatus, and non-transitory computer-readable medium described above, indicating the at least one set of the plurality of codebook sets includes transmitting control information in a TTI that triggers the UE to transmit the CSI report, where an index of the TTI corresponds to the at least one set of the plurality of codebook sets. In some examples of the method, apparatus, and non-transitory computer-readable medium described above, indicating the at least one set of the plurality of codebook sets includes configuring the UE to transmit CSI reports periodically, where an index of a TTI to be used for transmitting the CSI report corresponds to the at least one set of the plurality of codebook sets. In some examples of the method, apparatus, and non-transitory computer-readable medium described above, indicating the at least one set of the plurality of codebook sets includes configuring the UE to transmit CSI reports periodically, where an index of a reference TTI to be used to determine a TTI for transmitting the CSI report corresponds to the at least one set of the plurality of codebook sets.

In some examples of the method, apparatus, and non-transitory computer-readable medium described above, indicating the at least one set of the plurality of codebook sets includes transmitting control information in a first TTI having a first duration that triggers the UE to transmit the CSI report, where the first TTI may be within a second TTI having a second duration, and where an index of the second TTI corresponds to the at least one set of the plurality of codebook sets. In some examples of the method, apparatus, and non-transitory computer-readable medium described above, indicating the at least one set of the plurality of codebook sets includes configuring the UE to transmit CSI reports periodically, where the UE may be configured to transmit the CSI report in a first TTI having a first duration that may be within a second TTI having a second duration, and where an index of the second TTI corresponds to the at least one set of the plurality of codebook sets. In some examples of the method, apparatus, and non-transitory computer-readable medium described above, indicating the at least one set of the plurality of codebook sets includes configuring the UE to transmit CSI reports periodically, where the UE may be configured to determine a TTI in which to transmit the CSI report based at least in part on a reference TTI, and where an index of another TTI spanning the reference TTI corresponds to the at least one set of the plurality of codebook sets.

In some examples of the method, apparatus, and non-transitory computer-readable medium described above, indicating the at least one set of the plurality of codebook sets includes transmitting control information in a first TTI having a first duration that triggers the UE to transmit the CSI report, where the first TTI may be within a second TTI having a second duration, and where a first index of the first TTI and a second index of the second TTI corresponds to the at least one set of the plurality of codebook sets. In some examples of the method, apparatus, and non-transitory computer-readable medium described above, indicating the at least one set of the plurality of codebook sets includes configuring the UE to transmit CSI reports periodically, where the UE may be configured to transmit the CSI report in a first TTI having a first duration that may be within a second TTI having a second duration, and where a first index of the first TTI and a second index of the second TTI correspond to the at least one set of the plurality of codebook sets. In some examples of the method, apparatus, and non-transitory computer-readable medium described above, indicating the at least one set of the plurality of codebook sets includes configuring the UE to transmit CSI reports periodically, where the UE may be configured to determine a TTI in which to transmit the CSI report based at least in part on a reference TTI, and where a first index of the reference TTI and a second index of another TTI spanning the reference TTI correspond to the at least one set of the plurality of codebook sets.

In some examples of the method, apparatus, and non-transitory computer-readable medium described above, transmitting the indication of the plurality of codebook sets includes transmitting the indication of the plurality of codebook sets via RRC signaling. In some examples of the method, apparatus, and non-transitory computer-readable medium described above, a number of precoding matrices within each of the plurality of codebook sets may be based at least in part on an amount of time configured for the UE to generate and transmit CSI reports to the base station. In some examples of the method, apparatus, and non-transitory computer-readable medium described above, a number of precoding matrices within each of the plurality of codebook sets may be based at least in part on a periodicity with which the UE may be configured to transmit CSI reports to the base station. In some examples of the method, apparatus, and non-transitory computer-readable medium described above, a number of precoding matrices within each of the plurality of codebook sets may be based at least in part on a format of a control channel configured for the UE to use to transmit CSI reports to the base station.

DETAILED DESCRIPTION

Figure 1:
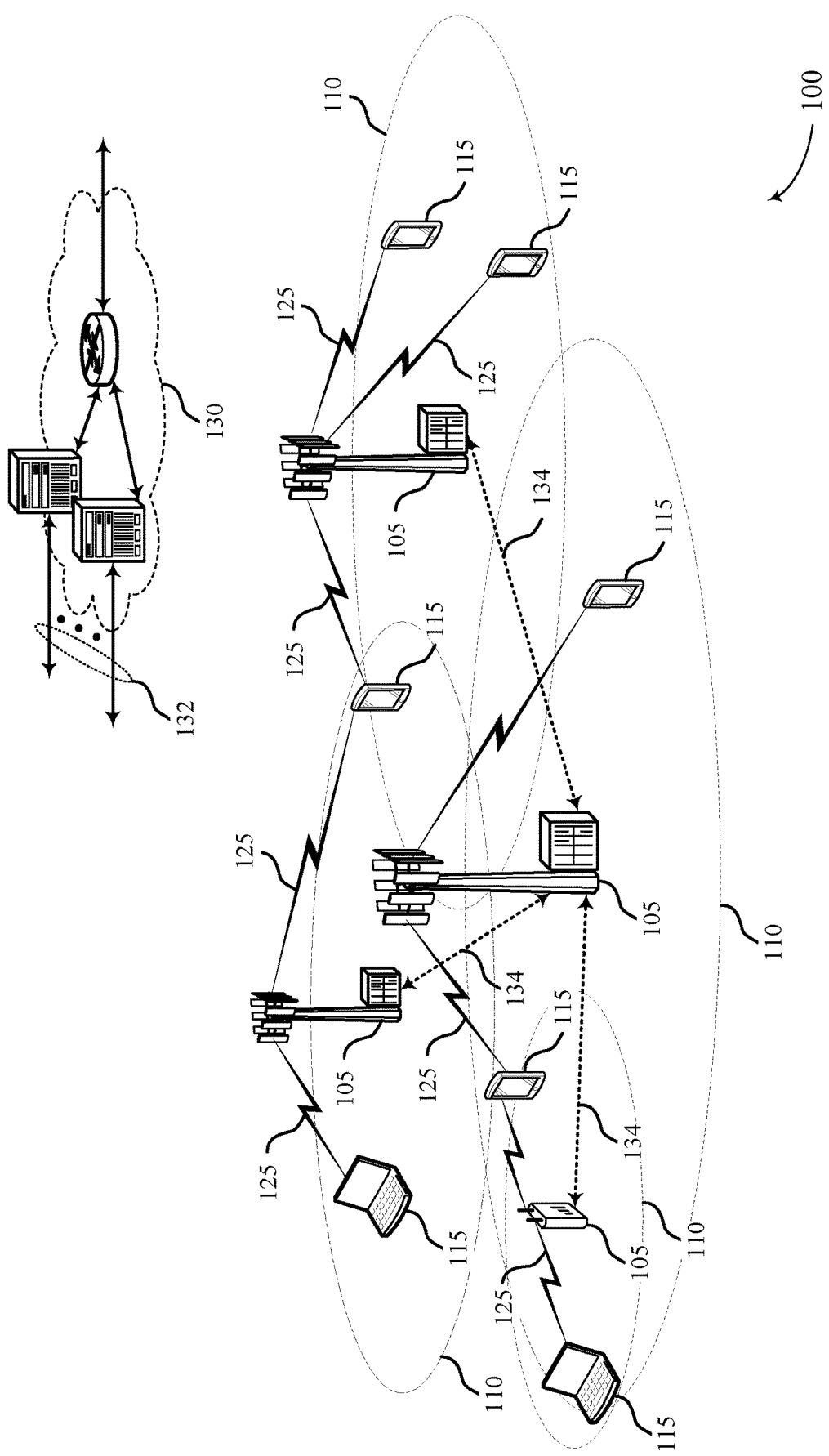
FIGS. 1 and 2 illustrate examples of wireless communications systems that support codebook restriction and sub-sampling for channel state information (CSI) reporting in accordance with various aspects of the present disclosure.

Some wireless communications systems may support uplink and downlink communications between a base station and a user equipment (UE). In some cases, it may be appropriate for a base station and a UE to support techniques for providing feedback to each other to improve the quality of communications between the wireless devices. In one example, a UE may be configured to transmit a channel state information (CSI) report to a base station to allow the base station to identify suitable configurations for transmitting downlink signals to the UE. In some cases, the CSI may include a precoding matrix indicator (PMI) that identifies a preferred precoding matrix selected by the UE for the base station to use to precode downlink transmissions to the UE. The UE may select the preferred precoding matrix from a number of precoding matrices that may be used by the base station to precode downlink transmissions to the UE.

In some wireless communications systems (e.g., fifth generation (5G) systems), a UE may have a limited amount of time to generate and transmit a CSI report to a base station. For example, the UE may be configured to support a shorter measurement time and a shorter reporting time (e.g., as compared to previous wireless systems). In addition, the UE may be configured to communicate using shortened transmission time intervals (TTIs) (sTTIs) (e.g., one-slot sTTIs or two-symbol sTTIs), but the UE may still be configured with a same number of sTTIs (as TTIs when compared to previous wireless systems) to generate and transmit a CSI report to a base station. Thus, the processing time available to the UE to generate and transmit a CSI report to the base station may be reduced significantly.

Accordingly, a wireless communications system may support techniques for limiting the amount of time a UE takes to generate and transmit a CSI report to a base station. In one example, a base station may restrict the number of precoding matrices that the UE may evaluate to identify a preferred precoding matrix. As a result, the UE may take less time to identify a preferred precoding matrix which may reduce the amount of time the UE may take to generate a CSI report. In conventional wireless communications systems, the base station may use RRC signaling to restrict the number of precoding matrices that the UE may evaluate. Specifically, the base station may identify a restricted set of precoding matrices for the UE to evaluate based on channel conditions.

In some wireless communications systems (e.g., 5G systems), however, channel conditions may change frequently. Accordingly, if RRC signaling is used to indicate a set of precoding matrices for a UE to evaluate, a base station may not be able to adapt the precoding matrices to changing channel conditions. That is, the base station may not be able to dynamically adapt the precoding matrices for a UE to evaluate based on changing channel conditions and interference properties (e.g., due to the bursty nature of interference in 5G systems). Accordingly, a preferred precoding matrix identified by a UE from a set of precoding matrices may not be selected from an appropriate set of precoding matrices (or an appropriate codebook). Thus, if this preferred precoding matrix is used by a base station for precoding a downlink transmission to the UE, the downlink transmission may be distorted, which may result in reduced throughput in a wireless communications system.

As described herein, a wireless communications system may support efficient techniques for dynamically indicating a set of precoding matrices for a UE to evaluate to identify a preferred precoding matrix. In one example, a base station may transmit downlink control information (DCI) to a UE to indicate a set of precoding matrices (or codebook) for the UE to evaluate to identify a preferred precoding matrix. In another example, a base station may explicitly indicate the set of precoding matrices (or the codebook) for the UE to evaluate to identify the preferred precoding matrix. For instance, the index of a TTI used to transmit control information that triggers the UE to transmit a CSI report may correspond to an index of a set of precoding matrices for the UE to evaluate to identify the preferred precoding matrix.

Aspects of the disclosure introduced above are described below in the context of a wireless communications system. Examples of processes and signaling exchanges that support codebook restriction and sub-sampling for CSI reporting are then described. Aspects of the disclosure are further illustrated by and described with reference to apparatus diagrams, system diagrams, and flowcharts that relate to codebook restriction and sub-sampling for CSI reporting.

FIG. 1 illustrates an example of a wireless communications system 100 that supports codebook restriction and sub-sampling for CSI reporting in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an ×2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe (e.g., a slot or two symbols) or may be dynamically selected (e.g., in bursts of sTTIs or in selected component carriers using sTTIs).

Wireless communications system 100 may operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 within wireless communications system 100 may transmit downlink signals to a UE 115 using various transmission techniques or transmission modes. Transmission modes used for downlink transmissions from a base station 105 to a UE 115 may be referred to as downlink transmission modes, and each downlink transmission mode supported by a base station 105 may be associated with the use of a particular number of antenna ports, spatial layers, etc. In some cases, one or more codewords may be modulated and mapped to a particular number of spatial layers for a downlink transmission based on a transmission mode configured to be used for the downlink transmission. In such cases, for some transmission modes, the modulations symbols mapped to each layer may be precoded using a precoding matrix identified by the base station 105.

In some examples, the base station 105 may identify a precoding matrix to use to precode a downlink transmission to a UE 115 based on feedback received from the UE 115. For example, for some transmission modes (e.g., transmission modes 4, 5, and 6, and, in some cases, transmission modes 8, 9, and 10), the base station 105 may receive a PMI from the UE 115 (e.g., in a CSI report) that identifies a preferred precoding matrix for the base station 105 to use to precode a downlink transmission to the UE 115. The base station 105 may then use the preferred precoding matrix to precode the downlink transmission to the UE 115. In some cases, however, the number of precoding matrices that the UE 115 may evaluate to identify the preferred precoding matrix (e.g., the precoding codebook size) may be large. As a result, the latency associated with identifying the preferred precoding matrix may be high, which may be detrimental to a wireless communications system.

Some wireless communications systems (e.g., LTE systems) may support techniques for limiting the number of precoding matrices that a UE 115 may evaluate to identify the preferred precoding matrix. For example, a base station 105 restrict the size of a codebook to be evaluated by a UE 115 if the base station 105 decides that some precoding matrices in the codebook are not useful for the current channel conditions or antenna configuration at the base station 105. The base station 105 may transmit a bitmap to the UE 115 that identifies the precoding matrices in the codebook that the UE 115 should refrain from evaluating to identify the preferred precoding matrix. The bitmap may correspond to a particular codebook and a particular transmission mode (e.g., transmission mode 4, 5, 6, 8, 9, or 10) configured to be used by base station 105. In some cases, the techniques for codebook restriction may also be applied to transmission modes that do not require PMI reporting (e.g., transmission mode 3). In this case, the codebook restriction restricts the number of ranks to be reported by a UE 115. Thus, using the techniques for codebook restriction, a UE 115 may be configured to evaluate less precoding matrices to identify the preferred precoding matrix, which may result in reduced latency at the UE 115.

In addition to techniques for codebook restriction, a UE 115 may also support techniques for codebook sub-sampling, where the UE 115 may evaluate less precoding matrices in a codebook to identify a preferred precoding matrix. Codebook sub-sampling may reduce the accuracy of the identified preferred precoding matrix but may also reduce the overhead associated with reporting the PMI to a base station 105 on a control channel (e.g., a physical uplink control channel (PUCCH)). In some examples, codebook sub-sampling may be implemented by a UE 115 for certain transmission modes (e.g., transmission modes 9 and 10). For these transmission modes, the UE 115 may be configured to perform a two-stage PMI reporting procedure. The first stage of the PMI reporting procedure may involve reporting a PMI based on wideband longer term channel properties, and the second stage of the PMI reporting procedure may involve reporting a PMI based on frequency selective short term channel properties. In each of these stages, the UE 115 may limit a number of precoding matrices to be evaluated using codebook sub-sampling, which may limit the overhead of PMI reporting.

In order to support codebook restriction techniques described above, a UE 115 may receive the bitmap that identifies the precoding matrices in a codebook that the UE 115 should refrain from evaluating via radio resource control (RRC) signaling. Similarly, in order to support the codebook sub-sampling techniques described above, a UE 115 may receive a sub-sampling indication that indicates the precoding matrices in a codebook that the UE 115 should evaluate via RRC signaling. In some cases, however, if the precoding matrices for a UE 115 to evaluate is indicated via RRC signaling, a base station 105 may not be able to adapt the precoding matrices to changing channel conditions. That is, the base station 105 may not be able to dynamically adapt the precoding matrices for a UE 115 to evaluate based on changing channel conditions and interference properties (e.g., due to the bursty nature of interference in some wireless communications systems).

Accordingly, a preferred precoding matrix identified by a UE 115 from a set of precoding matrices may not be selected from an appropriate set of precoding matrices (or an appropriate codebook). Thus, if this preferred precoding matrix is used by a base station for precoding a downlink transmission to the UE, the downlink transmission may be distorted, which may result in reduced throughput in a wireless communications system. Base stations 105 in wireless communications system 100 may support efficient techniques for adapting a set of precoding matrices for a UE 115 to evaluate based on changing channel conditions and interference properties.

Figure 2:
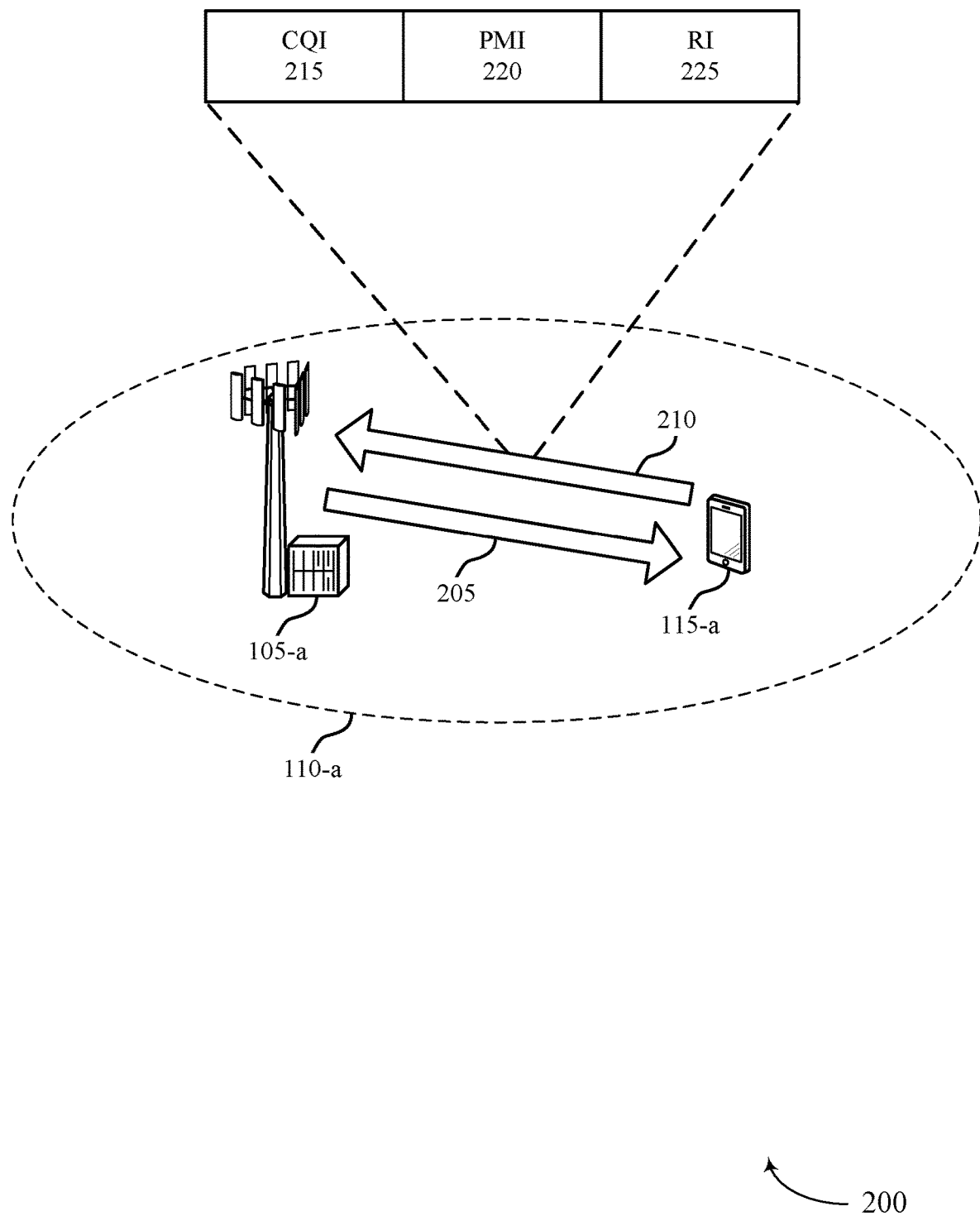

FIG. 2 illustrates an example of a wireless communications system 200 that supports codebook restriction and sub-sampling for CSI reporting in accordance with various aspects of the present disclosure. Wireless communications system 200 includes base station 105-a and UE 115-a, which may be examples of the corresponding devices described with reference to FIG. 1. Base station 105-a may communicate with wireless devices (including UE 115-a) within coverage area 110-a. For example, base station 105-a may transmit downlink signals to UE 115-a on resources of a carrier 205, and UE 115-a may transmit uplink signals to base station 105-a on resources of a carrier 210. In some cases, base station 105-a may communicate with UE 115-a using time division duplexing (TDD) techniques or frequency division duplexing (FDD) techniques. For TDD, base station 105-a may support a certain set of downlink transmission modes (e.g., transmission modes 1, 2, 3, 4, 6, 8, 9, and 10), and, for FDD, base station 105-a may support a different set of downlink transmission modes (e.g., transmission modes 1, 2, 3, 4, 6, 9, and 10).

Wireless communications system 200 may support communication between base station 105-a and UE 115-a using various antenna configurations, as described with reference to wireless communications system 100. Wireless communications system 200 may also implement other aspects of wireless communications system 100. In some cases, UE 115-a may be configured to report CSI to base station 105-a (e.g., periodically or aperiodically) based on, for example, reference signals received from base station 105-a (e.g., CSI reference signals (CSI-RSs)). A CSI report may include a channel quality indicator (CQI) 215, a PMI 220, and a rank indicator (RI) 225. For PMI reporting, UE 115-a may be configured to identify a preferred precoding matrix for base station 105-a to use to precode downlink transmissions to UE 115-a. UE 115-a may evaluate a subset of the precoding matrices that may be used by base station 105 to precode downlink transmissions to UE 115-a to identify the preferred precoding matrix.

In some wireless communications systems (e.g., LTE systems), a base station 105 may use RRC signaling to indicate precoding matrices to a UE 115 that the UE 115 should evaluate to identify a preferred precoding matrix (e.g., using techniques for codebook restriction or codebook sub-sampling). However, such RRC signaling from the base station 105 may be infrequent (e.g., semi-static), and the base station may not be able to dynamically adapt the precoding matrices for the UE 115 to evaluate based on changing channel conditions. Thus, at any given time, because the channel conditions may have changed since the UE 115 received the RRC signaling from the base station 105, the preferred precoding matrix identified by a UE 115 may not be selected from an appropriate set of precoding matrices (or an appropriate codebook). As such, the signal quality of a downlink transmission precoded using the preferred precoding matrix may be low, which may result in reduced throughput in a wireless communications system.

Base station 105-*a* may support efficient techniques for dynamically adapting the precoding matrices for UE 115-*a* to evaluate based on changing channel conditions. In particular, base station 105-*a* may support techniques for dynamically indicating, to UE 115-*a*, an appropriate set of precoding matrices for UE 115-*a* to evaluate to identify a preferred precoding matrix. Initially, base station 105-*a* may generate (or otherwise determine) multiple codebook sets each including one or more precoding matrices for precoding downlink transmissions to UE 115-*a*, and base station 105-*a* may transmit an indication of the codebook sets to UE 115-*a*. Then, base station 105-*a* may dynamically indicate an appropriate codebook set for UE 115-*a* to evaluate based on the channel conditions at a given time.

Figure 3:
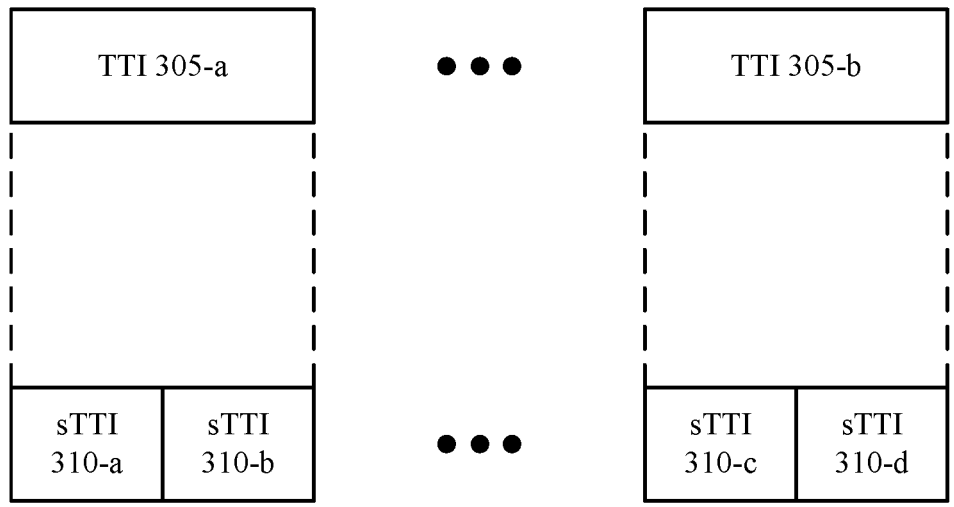
FIG. 3 illustrates an example of resources used to dynamically indicate an appropriate codebook set for a user equipment (UE) to evaluate in accordance with various aspects of the present disclosure.

FIG. 3 illustrates an example of resources 300 used by base station 105-*a* to dynamically indicate an appropriate codebook set for UE 115-*a* to evaluate in accordance with various aspects of the present disclosure. Base station 105-*a* may communicate with UE 115-*a* during sTTIs 310 (e.g., one-slot sTTIs (as shown) or two-symbol sTTIs (not shown)). Each of the sTTIs 310 may be within a TTI 305 (e.g., a subframe) that has a longer duration than the sTTI 310. In some cases, base station 105-*a* may explicitly indicate the appropriate codebook set for UE 115-*a* to evaluate to identify a preferred precoding matrix. For example, base station 105-*a* may transmit DCI (e.g., a fast or slow grant) to UE 115-*a* that indicates the codebook set for UE 115-*a* to evaluate to identify the preferred precoding matrix. In other cases, base station 105-*a* may implicitly indicate the appropriate codebook set for UE 115-*a* to evaluate to identify the preferred precoding matrix.

For example, base station 105-*a* may transmit control information in an sTTI 310 that triggers UE 115-*a* to transmit a CSI report to the base station 105-*a* (e.g., aperiodic CSI reporting). This sTTI 310 may be referred to as a CSI triggering sTTI. In one example, the index of the CSI triggering sTTI 310 may correspond to the codebook set for UE 115-*a* to evaluate to identify the preferred precoding matrix. In another example, the index of a TTI 305 that spans the CSI triggering sTTI 310 may correspond to the codebook set for UE 115-*a* to evaluate to identify the preferred precoding matrix. In yet another example, both the index of the CSI triggering sTTI 310 and the index of a TTI 305 that spans the CSI triggering sTTI 310 may correspond to the codebook set for UE 115-*a* to evaluate to identify the preferred precoding matrix.

In other aspects, base station 105-*a* may configure UE 115-*a* to transmit CSI reports periodically, and UE 115-*a* may identify a codebook set to evaluate based on one or more TTIs used to transmit a CSI report. In one example, the index of the sTTI 310 in which the UE 115-*a* is configured to transmit a CSI report may correspond to the codebook set for UE 115-*a* to evaluate to identify the preferred precoding matrix. In another example, the index of a TTI 305 that spans the sTTI 310 in which the UE 115-*a* is configured to transmit a CSI report may correspond to the codebook set for UE 115-*a* to evaluate to identify the preferred precoding matrix. In yet another example, both the index of the sTTI 310 in which the UE 115-*a* is configured to transmit a CSI report and the index of a TTI 305 that spans the sTTI 310 may correspond to the codebook set for UE 115-*a* to evaluate to identify the preferred precoding matrix.

In yet other aspects, base station 105-*a* may configure UE 115-*a* to transmit CSI reports periodically, and UE 115-*a* may identify a codebook set to evaluate based on one or more reference TTIs used to determine the TTI used to transmit the CSI reports. In one example, the index of a reference sTTI 310 used to determine the sTTI 310 to be used to transmit a CSI report may correspond to the codebook set for UE 115-*a* to evaluate to identify the preferred precoding matrix. In another example, the index of a TTI 305 that spans a reference sTTI 310 used to determine the sTTI 310 to be used to transmit a CSI report may correspond to the codebook set for UE 115-*a* to evaluate to identify the preferred precoding matrix. In yet another example, both the index of a TTI 305 that spans a reference sTTI 310 used to determine the sTTI 310 to be used to transmit a CSI report and the index of the reference sTTI 310 may correspond to the codebook set for UE 115-*a* to evaluate to identify the preferred precoding matrix.

In addition to supporting the techniques described above for dynamically indicating a codebook set for UE 115-*a* to evaluate, wireless communications system 200 may also support techniques for identifying an appropriate size of a codebook for UE 115-*a* to evaluate. In one aspect, the size of a codebook for UE 115-*a* to evaluate may depend on an amount of time configured for the UE 115-*a* to generate and transmit a CSI report to base station 105-*a*. For example, base station 105-*a* may configure UE 115-*a* to evaluate less precoding matrices when the UE 115-*a* is configured to generate and report CSI feedback to base station 105-*a* within four TTIs, and base station 105-*a* may configure UE 115-*a* to evaluate more precoding matrices when the UE 115-*a* is configured to generate and report CSI feedback to base station 105-*a* within six TTIs.

In another aspect, the size of a codebook for UE 115-*a* to evaluate may depend on a periodicity with which UE 115-*a* is configured to transmit CSI reports to base station 105-*a*. For example, base station 105-*a* may configure UE 115-*a* to evaluate less precoding matrices when the UE 115-*a* is configured to transmit CSI reports to base station 105-*a* with a periodicity that is below a threshold, and base station 105-*a* may configure UE 115-*a* to evaluate more precoding matrices when the UE 115-*a* is configured to transmit CSI reports to base station 105-*a* with a periodicity that is above a threshold.

In yet another aspect, the size of a codebook for UE 115-*a* to evaluate may depend on a format of a control channel (e.g., a shortened PUCCH (sPUCCH)) to be used to transmit a CSI report to base station 105-*a*. For example, base station 105-*a* may configure UE 115-*a* to evaluate more precoding matrices when a control channel to be used for CSI reporting is capable of carrying a threshold number of bits (e.g., when the control channel spans two or three symbols). Otherwise, base station 105-*a* may configure UE 115-*a* to evaluate less precoding matrices (e.g., when the control channel spans one symbol).

Figure 4:
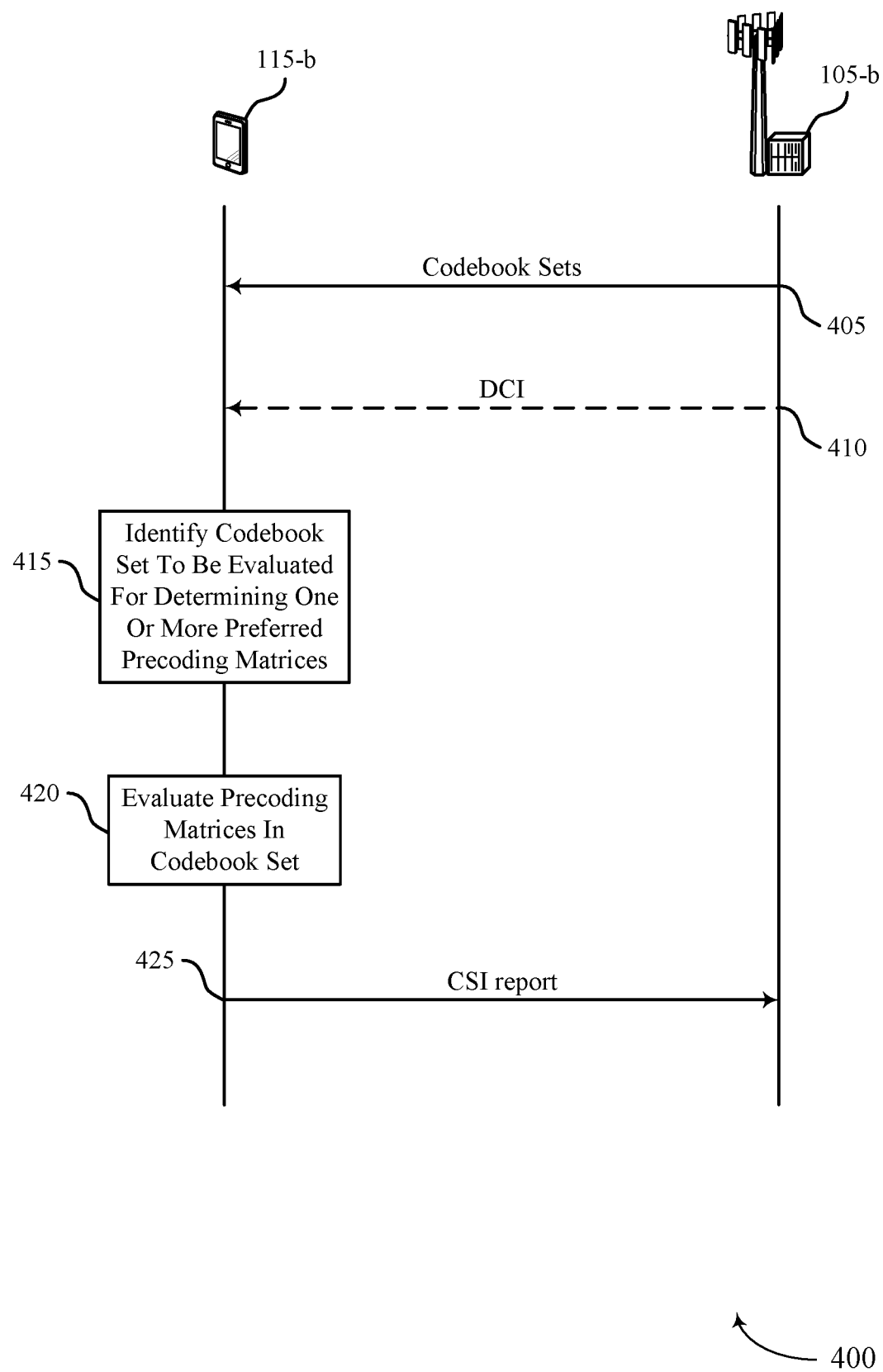
FIG. 4 illustrates an example of a process flow that supports codebook restriction and sub-sampling for CSI reporting in accordance with various aspects of the present disclosure.

FIG. 4 illustrates an example of a process flow 400 that supports codebook restriction and sub-sampling for CSI reporting in accordance with various aspects of the present disclosure. Process flow 400 illustrates aspects of techniques performed by base station 105-*b*, which may be an example of a base station 105 described with reference to FIGS. 1-3. Process flow 400 also illustrates aspects of techniques performed by a UE 115-*b*, which may be an example of a UE 115 described with reference to FIGS. 1-3.

In some cases, base station 105-*b* may configure UE 115-*b* to report CSI periodically. In some examples, UE 115-*b* may be configured to report CSI for a wideband. In such examples, UE 115-*b* may be configured to avoid including a PMI in the CSI report, or UE 115-*b* may be configured to include a single PMI in the CSI report. In other examples, UE 115-*b* may be configured to report CSI for a UE selected sub-band. In such examples, UE 115-*b* may be configured to avoid including a PMI in the CSI report, or UE 115-*b* may be configured to include a single PMI in the CSI report.

In other cases, base station 105-*b* may configure UE 115-*b* to report CSI aperiodically. In some examples, UE 115-*b* may be configured to report CSI for a wideband, and the UE 115-*b* may be configured to include multiple PMIs in the CSI report. In other examples, UE 115-*b* may be configured to report CSI for a UE-selected sub-band. In such examples, UE 115-*b* may be configured to avoid including a PMI in the CSI report, or UE 115-*b* may be configured to include multiple PMIs in the CSI report. In yet other examples, UE 115-*b* may be configured to report CSI for a configured sub-band. In such examples, UE 115-*b* may be configured to avoid including a PMI in the CSI report, or UE 115-*b* may be configured to include a single PMI in the CSI report.

At 405, base station 105-*b* may transmit an indication of a plurality of codebook sets to UE 115-*b* (e.g., via RRC signaling). Each codebook set may include one or more precoding matrices for precoding downlink transmissions to the UE. Base station 105-*b* may also transmit an indication of the precoding matrices in each codebook set. Base station 105-*b* may then indicate, to UE 115-*b*, at least one set of the plurality of codebook sets for UE 115-*b* to evaluate to determine one or more preferred precoding matrices.

In some cases, at 410, base station 105-*b* may transmit a message (e.g., including DCI) that indicates the at least one set of the plurality of codebook sets for UE 115-*b* to evaluate to determine the one or more preferred precoding matrices. In other cases, base station 105-*b* may implicitly indicate the at least one set of the plurality of codebook sets for UE 115-*b* to evaluate to determine the one or more preferred precoding matrices. For example, the base station 105-*b* may transmit an indication of an index associated with each codebook set to UE 115-*b*, and base station 105-*b* may implicitly indicate the index of the at least one set to of the plurality of codebook sets for UE 115-*b* to evaluate.

In some aspects, base station 105-*b* may transmit control information in an sTTI that configures UE 115-*b* to transmit a CSI report. This sTTI may be referred to as a CSI triggering sTTI. In one example, the index of the CSI triggering sTTI may correspond to the at least one set of the plurality of codebook sets for UE 115-*b* to evaluate. For instance, if two codebook sets are configured, and the index of the CSI triggering sTTI is even, the UE 115-*b* may evaluate a first codebook set of the two codebook sets. Alternatively, if the index of the CSI triggering sTTI is odd, the UE 115-*b* may evaluate a second codebook set of the two codebook sets.

In another example, the index of a TTI spanning the CSI triggering sTTI may correspond to the at least one set of the plurality of codebook sets for UE 115-*b* to evaluate. In yet another example, both the index of a TTI spanning the CSI triggering sTTI and the index of the CSI triggering sTTI may correspond to the at least one set of the plurality of codebook sets for UE 115-*b* to evaluate. For instance, if four codebook sets are configured, then different combinations of indices of the TTI and the CSI triggering sTTI may correspond to different codebook sets.

If the indices of the TTI spanning the CSI triggering sTTI and the index of the CSI triggering sTTI are even, UE 115-*b* may evaluate a first codebook set. If the index of the TTI spanning the CSI triggering sTTI is even and the index of the CSI triggering sTTI is odd, UE 115-*b* may evaluate a second codebook set. If the index of the TTI spanning the CSI triggering sTTI is odd and the index of the CSI triggering sTTI is even, UE 115-*b* may evaluate a third codebook set. And if the indices of the TTI spanning the CSI triggering sTTI and the index of the CSI triggering sTTI are odd, UE 115-*b* may evaluate a fourth codebook set.

In other aspects, base station 105-*b* may configure UE 115-*b* to transmit CSI reports periodically, and the base station 105-*b* may implicitly indicate the at least one set of the plurality of codebook sets for UE 115-*b* to evaluate using an sTTI configured to be used for CSI reporting. In one example, the index of an sTTI to be used for CSI reporting may correspond to the at least one set of the plurality of codebook sets for UE 115-*b* to evaluate. In another example, the index of a TTI spanning the sTTI to be used for CSI reporting may correspond to the at least one set of the plurality of codebook sets for UE 115-*b* to evaluate. In yet another example, both the index of a TTI spanning the sTTI to be used for CSI reporting and the index of the sTTI to be used for CSI reporting may correspond to the at least one set of the plurality of codebook sets for UE 115-*b* to evaluate.

In yet other aspects, base station 105-*b* may configure UE 115-*b* to transmit CSI reports periodically, and the base station 105-*b* may implicitly indicate the at least one set of the plurality of codebook sets for UE 115-*b* to evaluate using a reference sTTI to be used to determine an appropriate sTTI for CSI reporting. In one example, the index of a reference sTTI to be used to determine an sTTI for CSI reporting may correspond to the at least one set of the plurality of codebook sets for UE 115-*b* to evaluate. In another example, the index of a TTI spanning the reference sTTI to be used to determine an appropriate sTTI for CSI reporting may correspond to the at least one set of the plurality of codebook sets for UE 115-*b* to evaluate. In yet another example, the index of a TTI spanning the reference sTTI to be used to determine an appropriate sTTI for CSI reporting and the index of the reference sTTI may correspond to the at least one set of the plurality of codebook sets for UE 115-*b* to evaluate.

In each of the examples described above for implicitly indicating the at least one set based on an index of an sTTI and/or an index of a TTI spanning the sTTI, the indicated codebook set may depend on whether the indices of the sTTI and the TTI spanning the sTTI are even or odd. In other examples, however, the codebook set index may be determined based on a function of the indices of the sTTI and the TTI spanning the sTTI. For example, the codebook set index may be determined using equation 1 below:

$$\text{Codebook set index} = [y * \text{TTI index} + \text{sTTI index}] \mod X \quad (1)$$

where y corresponds to the number of sTTIs within each subframe (e.g., TTI), and X corresponds to the number of codebook sets defined. Accordingly, different combinations of TTI and sTTI indices may be used to identify different codebook sets.

Once UE 115-*b* identifies the explicit or implicit indication of the at least one set of the plurality of codebook sets to be evaluated for determining the one or more preferred precoding matrices, UE 115-*b* may identify the at least one set at 415. At 420, UE 115-*b* may then evaluate the one or more precoding matrices in the at least one set to determine the one or more preferred precoding matrices. In some cases (e.g., at a first CSI reporting stage for transmission modes 9 and 10), UE 115-*b* may determine the one or more preferred precoding matrices based on long term channel properties of a channel to be used for a downlink transmission to UE 115-*b*. In other cases (e.g., at a second CSI reporting stage for transmission modes 9 and 10), UE 115-*b* may determine the one or more preferred precoding matrices based on frequency selective short term channel properties of a channel to be used for a downlink transmission to UE 115-*b*. At 425, after UE 115-b determines the one or more preferred precoding matrices, UE 115-b may transmit a PMI of the one or more preferred precoding matrices in a CSI report to base station 105-.

Figure 5:
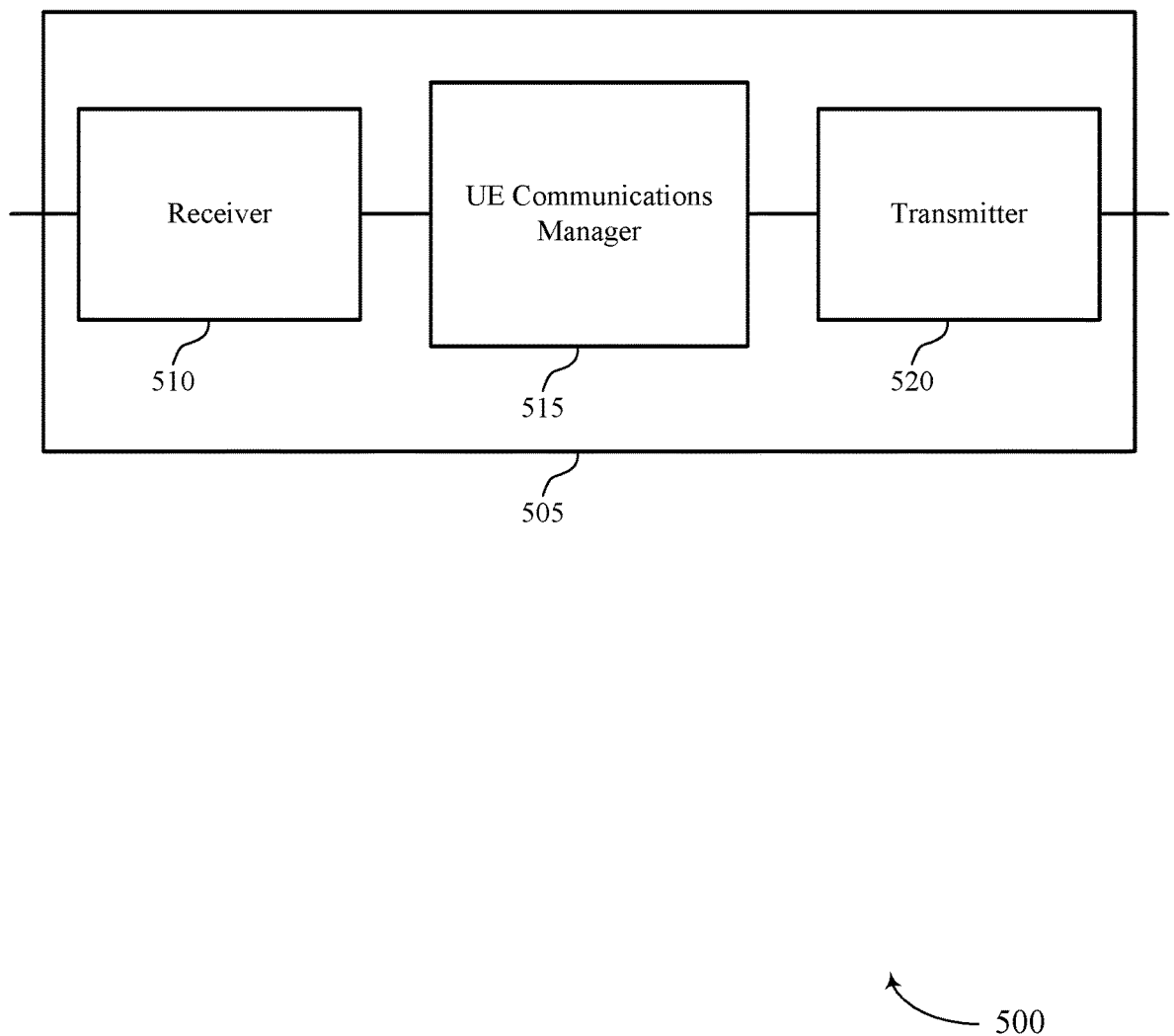
FIGS. 5 and 6 show block diagrams of a device that supports codebook restriction and sub-sampling for CSI reporting in accordance with various aspects of the present disclosure.

FIG. 5 shows a block diagram 500 of a wireless device 505 that supports codebook restriction and sub-sampling for CSI reporting in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to codebook restriction and sub-sampling for CSI reporting, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, from a base station, an indication of a set of codebook sets, each codebook set including one or more precoding matrices for precoding downlink transmissions to the wireless device 505, identify at least one set of the set of codebook sets to be evaluated for determining one or more preferred precoding matrices, evaluate the one or more precoding matrices in the at least one set to determine the one or more preferred precoding matrices, and transmit, to the base station, a PMI of the one or more preferred precoding matrices in a CSI report.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
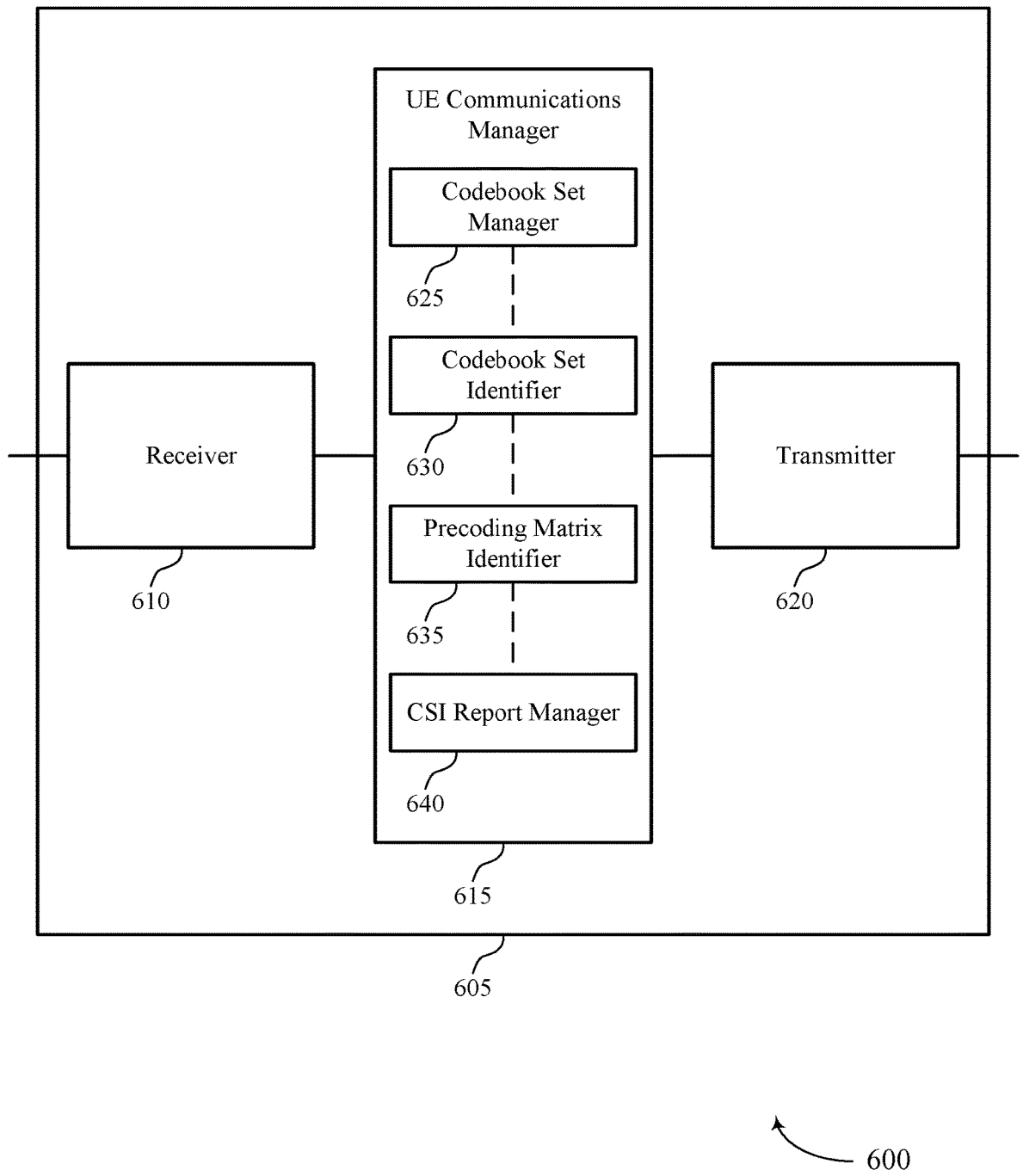

FIG. 6 shows a block diagram 600 of a wireless device 605 that supports codebook restriction and sub-sampling for CSI reporting in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to codebook restriction and sub-sampling for CSI reporting, etc.). Information may be passed on to other components of the device. The receiver 610 may be an example of aspects of the transceiver 735 described with reference to FIG. 7. The receiver 610 may utilize a single antenna or a set of antennas.

UE communications manager 615 may be an example of aspects of the UE communications manager 715 described with reference to FIG. 7. UE communications manager 615 may include codebook set manager 625, codebook set identifier 630, precoding matrix identifier 635, and CSI report manager 640.

Codebook set manager 625 may receive, from a base station, an indication of a set of codebook sets, each codebook set including one or more precoding matrices for precoding downlink transmissions to the wireless device 605. In some cases, receiving the indication of the set of codebook sets includes receiving the indication of the set of codebook sets via RRC signaling. In some cases, a number of precoding matrices within each of the set of codebook sets is based on an amount of time configured for the wireless device 605 to generate and transmit CSI reports to a base station. In some cases, a number of precoding matrices within each of the set of codebook sets is based on a periodicity with which the wireless device 605 is configured to transmit CSI reports to a base station. In some cases, a number of precoding matrices within each of the set of codebook sets is based on a format of a control channel configured for the wireless device 605 to use to transmit CSI reports to a base station.

Codebook set identifier 630 may identify at least one set of the set of codebook sets to be evaluated for determining one or more preferred precoding matrices. In some cases, codebook set identifier 630 may receive a message indicating the at least one set of the set of codebook sets to be evaluated for determining the one or more preferred precoding matrices, and codebook set identifier 630 may identify the at least one set based on the message. In some cases, the message includes DCI that indicates the at least one set of the set of codebook sets. In some cases, codebook set identifier 630 may determine the at least one set of the set of codebook sets based on one or more predetermined rules.

In some cases, codebook set identifier 630 may receive control information in a TTI that triggers the wireless device 605 to transmit the CSI report, and codebook set identifier 630 may determine the at least one set based on an index of the TTI. In some cases, codebook set identifier 630 may identify a TTI in which to transmit the CSI report based on a configuration, at the wireless device 605, for periodic CSI reporting, and codebook set identifier 630 may determine the at least one set based on an index of the TTI. In some cases, codebook set identifier 630 may identify a reference TTI to use to determine a TTI in which to transmit the CSI report based on a configuration, at the wireless device 605, for periodic CSI reporting, and codebook set identifier 630 may determine the at least one set based on an index of the reference TTI.

In some cases, codebook set identifier 630 may receive control information in a first TTI having a first duration that triggers the wireless device 605 to transmit the CSI report, where the first TTI is within a second TTI having a second duration, and codebook set identifier 630 may determine the at least one set based on an index of the second TTI. In some cases, codebook set identifier 630 may identify a first TTI having a first duration in which to transmit the CSI report based on a configuration, at the wireless device 605, for periodic CSI reporting, where the first TTI is within a second TTI having a second duration, and codebook set identifier 630 may determine the at least one set based on an index of the second TTI. In some cases, codebook set identifier 630 may identify a reference TTI to use to determine a TTI in which to transmit the CSI report based on a configuration, at the wireless device 605, for periodic CSI reporting, where the reference TTI includes a first TTI having a first duration that is within a second TTI having a second duration, and codebook set identifier 630 may determine the at least one set based on an index of the second TTI.

In some cases, codebook set identifier 630 may receive control information in a first TTI having a first duration that triggers the wireless device 605 to transmit the CSI report, where the first TTI is within a second TTI having a second duration, and codebook set identifier 630 may determine the at least one set based on a first index of the first TTI and a second index of the second TTI. In some cases, codebook set identifier 630 may identify a first TTI having a first duration in which to transmit the CSI report based on a configuration, at the wireless device 605, for periodic CSI reporting, where the first TTI is within a second TTI having a second duration, and codebook set identifier 630 may determine the at least one set based on a first index of the first TTI and a second index of the second TTI. In some cases, codebook set identifier 630 may identify a reference TTI to use to determine a TTI in which to transmit the CSI report based on a configuration, at the wireless device 605, for periodic CSI reporting, where the reference TTI includes a first TTI having a first duration that is within a second TTI having a second duration, and codebook set identifier 630 may determine the at least one set based on a first index of the first TTI and a second index of the second TTI.

Precoding matrix identifier 635 may evaluate the one or more precoding matrices in the at least one set to determine the one or more preferred precoding matrices. In some cases, evaluating the one or more precoding matrices in the at least one set to determine the one or more preferred precoding matrices includes determining the one or more preferred precoding matrices based on long term channel properties of a channel to be used for downlink transmission to the wireless device 605. In other cases, evaluating the one or more precoding matrices in the at least one set to determine the one or more preferred precoding matrices includes determining the one or more preferred precoding matrices based on frequency selective short term channel properties of a channel to be used for downlink transmission to the wireless device 605.

CSI report manager 640 may transmit, to the base station, a PMI of the one or more preferred precoding matrices in a CSI report. In some cases, the wireless device 605 is configured to transmit CSI reports to a base station periodically or aperiodically.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
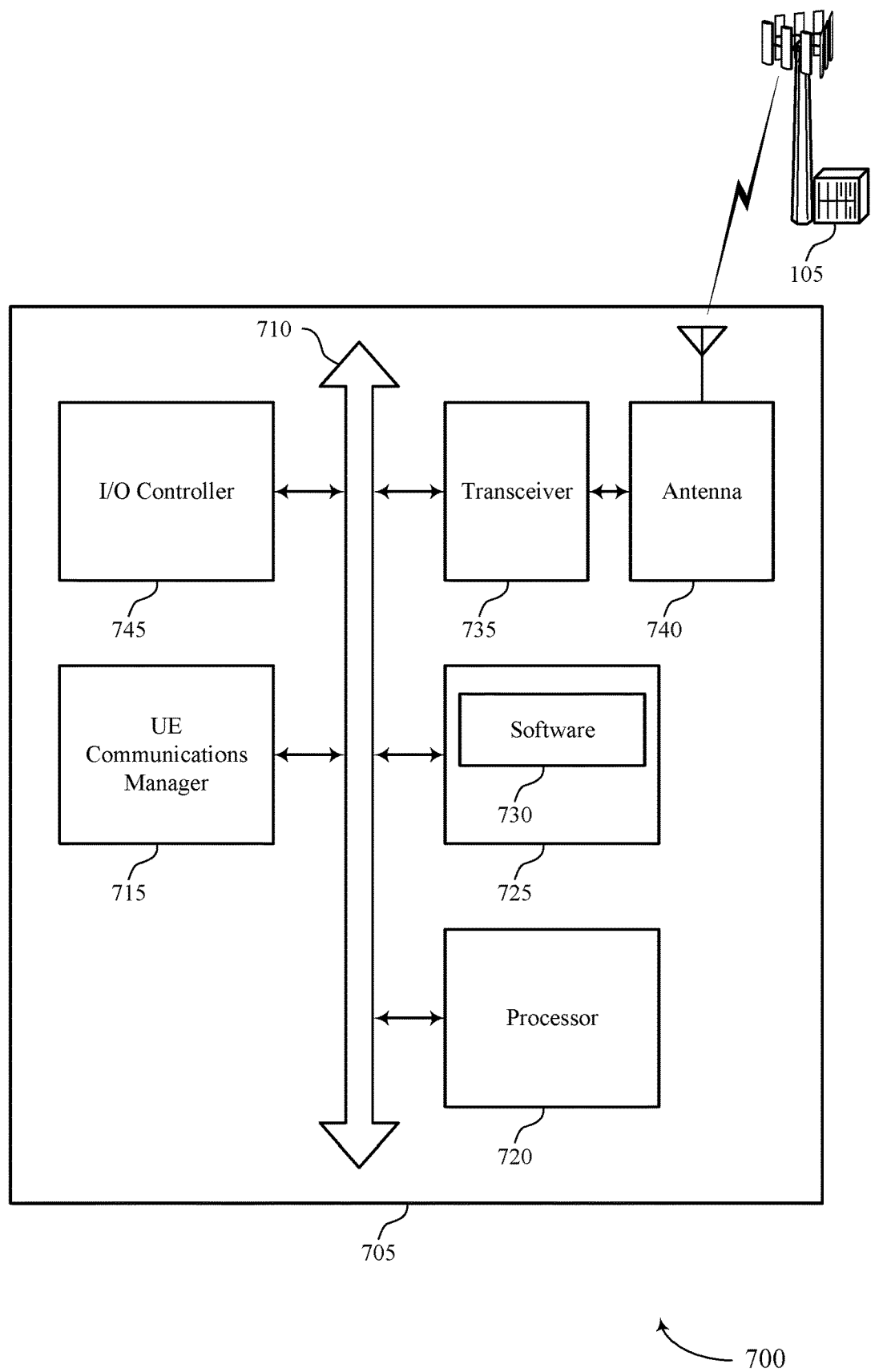
FIG. 7 illustrates a block diagram of a system including a UE that supports codebook restriction and sub-sampling for CSI reporting in accordance with various aspects of the present disclosure.

FIG. 7 shows a diagram of a system 700 including a device 705 that supports codebook restriction and sub-sampling for CSI reporting in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting codebook restriction and sub-sampling for CSI reporting).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support codebook restriction and sub-sampling for CSI reporting. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
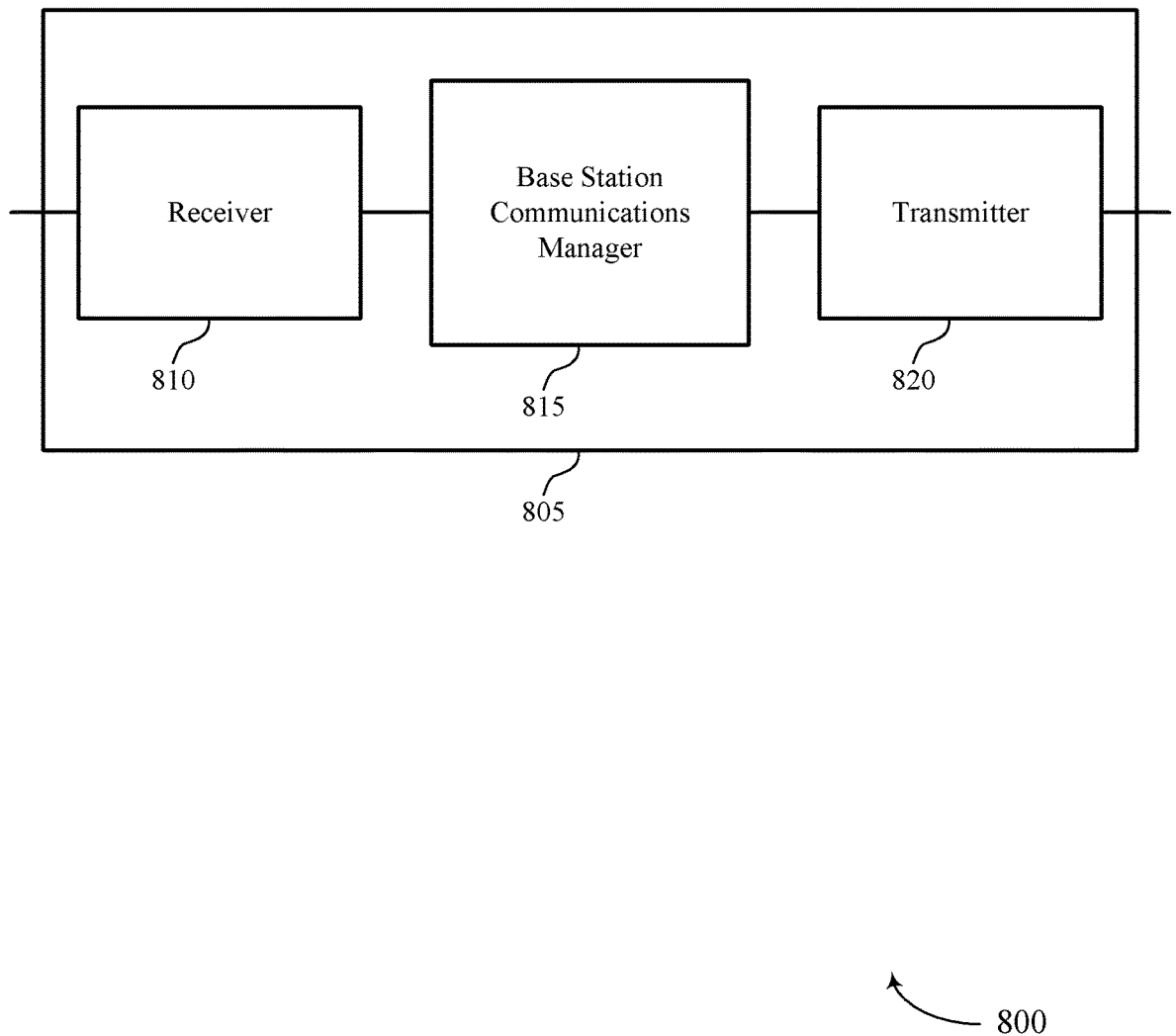
FIGS. 8 and 9 show block diagrams of a device that supports codebook restriction and sub-sampling for CSI reporting in accordance with various aspects of the present disclosure.

FIG. 8 shows a block diagram 800 of a wireless device 805 that supports codebook restriction and sub-sampling for CSI reporting in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to codebook restriction and sub-sampling for CSI reporting, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit, to a UE, an indication of a set of codebook sets, each codebook set including one or more precoding matrices for precoding downlink transmissions to the UE, indicate, to the UE, at least one set of the set of codebook sets for the UE to evaluate to determine one or more preferred precoding matrices, and receive, from the UE, a PMI of the one or more preferred precoding matrices in a CSI report.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
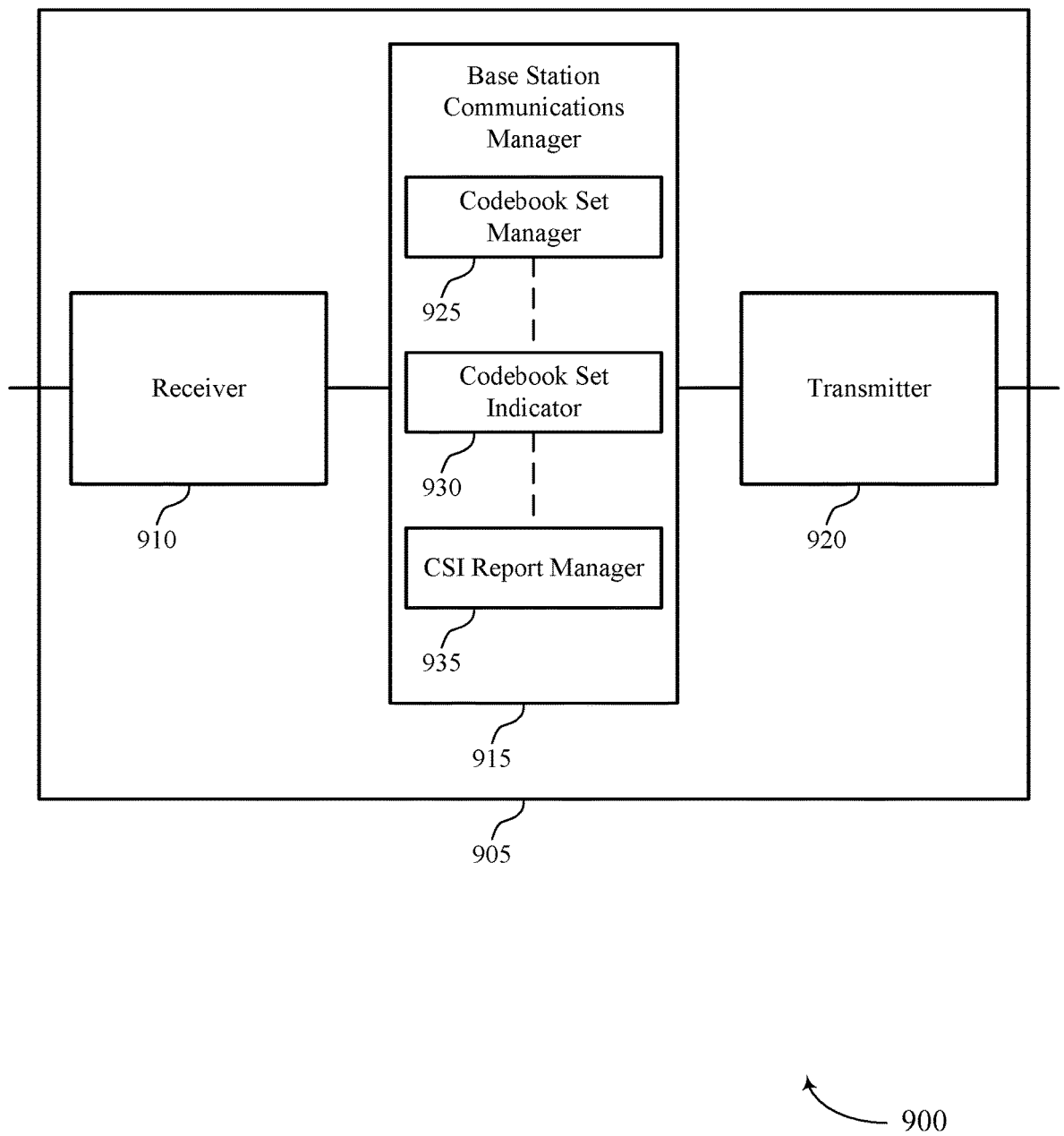

FIG. 9 shows a block diagram 900 of a wireless device 905 that supports codebook restriction and sub-sampling for CSI reporting in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to codebook restriction and sub-sampling for CSI reporting, etc.). Information may be passed on to other components of the device. The receiver 910 may be an example of aspects of the transceiver 1035 described with reference to FIG. 10. The receiver 910 may utilize a single antenna or a set of antennas.

Base station communications manager 915 may be an example of aspects of the base station communications manager 1015 described with reference to FIG. 10. Base station communications manager 915 may include codebook set manager 925, codebook set indicator 930, and CSI report manager 935.

Codebook set manager 925 may transmit, to a UE, an indication of a set of codebook sets, each codebook set including one or more precoding matrices for precoding downlink transmissions to the UE. In some cases, transmitting the indication of the set of codebook sets includes transmitting the indication of the set of codebook sets via RRC signaling. In some cases, a number of precoding matrices within each of the set of codebook sets is based on an amount of time configured for the UE to generate and transmit CSI reports to the wireless device 905. In some cases, a number of precoding matrices within each of the set of codebook sets is based on a periodicity with which the UE is configured to transmit CSI reports to the wireless device 905. In some cases, a number of precoding matrices within each of the set of codebook sets is based on a format of a control channel configured for the UE to use to transmit CSI reports to the wireless device 905.

Codebook set indicator 930 may indicate, to the UE, at least one set of the set of codebook sets for the UE to evaluate to determine one or more preferred precoding matrices. In some cases, indicating the at least one set of the set of codebook sets includes transmitting a message indicating the at least one set of the set of codebook sets for the UE to evaluate to determine the one or more preferred precoding matrices. In some cases, the message includes DCI that indicates the at least one set of the set of codebook sets.

In some cases, indicating the at least one set of the set of codebook sets includes transmitting control information in a TTI that triggers the UE to transmit the CSI report, where an index of the TTI corresponds to the at least one set of the set of codebook sets. In some cases, indicating the at least one set of the set of codebook sets includes configuring the UE to transmit CSI reports periodically, where an index of a TTI to be used for transmitting the CSI report corresponds to the at least one set of the set of codebook sets. In some cases, indicating the at least one set of the set of codebook sets includes configuring the UE to transmit CSI reports periodically, where an index of a reference TTI to be used to determine a TTI for transmitting the CSI report corresponds to the at least one set of the set of codebook sets.

In some cases, indicating the at least one set of the set of codebook sets includes transmitting control information in a first TTI having a first duration that triggers the UE to transmit the CSI report, where the first TTI is within a second TTI having a second duration, and where an index of the second TTI corresponds to the at least one set of the set of codebook sets. In some cases, indicating the at least one set of the set of codebook sets includes configuring the UE to transmit CSI reports periodically, where the UE is configured to transmit the CSI report in a first TTI having a first duration that is within a second TTI having a second duration, and where an index of the second TTI corresponds to the at least one set of the set of codebook sets. In some cases, indicating the at least one set of the set of codebook sets includes configuring the UE to transmit CSI reports periodically, where the UE is configured to determine a TTI in which to transmit the CSI report based on a reference TTI, and where an index of another TTI spanning the reference TTI corresponds to the at least one set of the set of codebook sets.

In some cases, indicating the at least one set of the set of codebook sets includes transmitting control information in a first TTI having a first duration that triggers the UE to transmit the CSI report, where the first TTI is within a second TTI having a second duration, and where a first index of the first TTI and a second index of the second TTI corresponds to the at least one set of the set of codebook sets. In some cases, indicating the at least one set of the set of codebook sets includes configuring the UE to transmit CSI reports periodically, where the UE is configured to transmit the CSI report in a first TTI having a first duration that is within a second TTI having a second duration, and where a first index of the first TTI and a second index of the second TTI correspond to the at least one set of the set of codebook sets. In some cases, indicating the at least one set of the set of codebook sets includes configuring the UE to transmit CSI reports periodically, where the UE is configured to determine a TTI in which to transmit the CSI report based on a reference TTI, and where a first index of the reference TTI and a second index of another TTI spanning the reference TTI correspond to the at least one set of the set of codebook sets.

CSI report manager 935 may receive, from the UE, a PMI of the one or more preferred precoding matrices in a CSI report.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
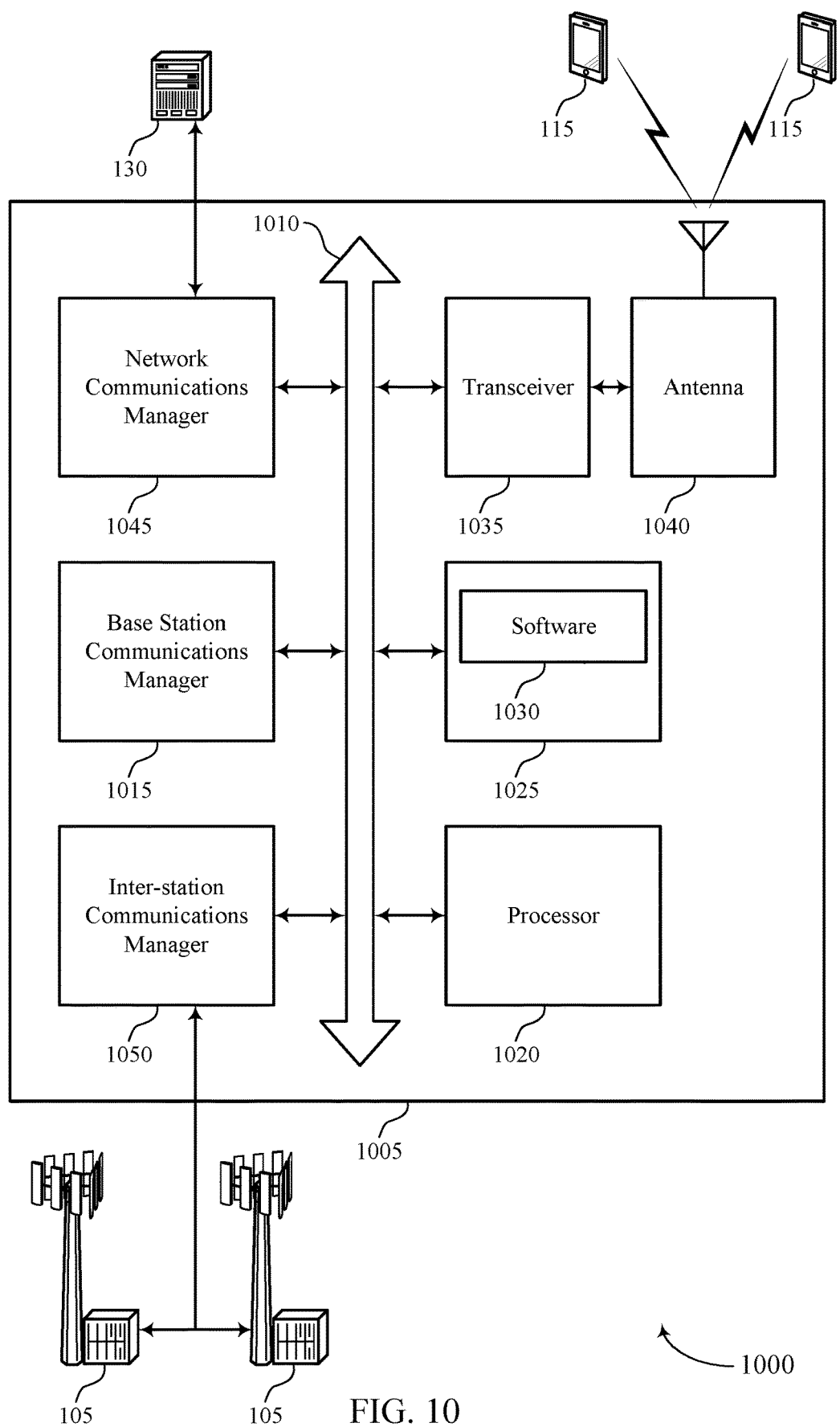
FIG. 10 illustrates a block diagram of a system including a base station that supports codebook restriction and sub-sampling for CSI reporting in accordance with aspects of the present disclosure.

FIG. 10 shows a diagram of a system 1000 including a device 1005 that supports codebook restriction and sub-sampling for CSI reporting in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting codebook restriction and sub-sampling for CSI reporting).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support codebook restriction and sub-sampling for CSI reporting. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
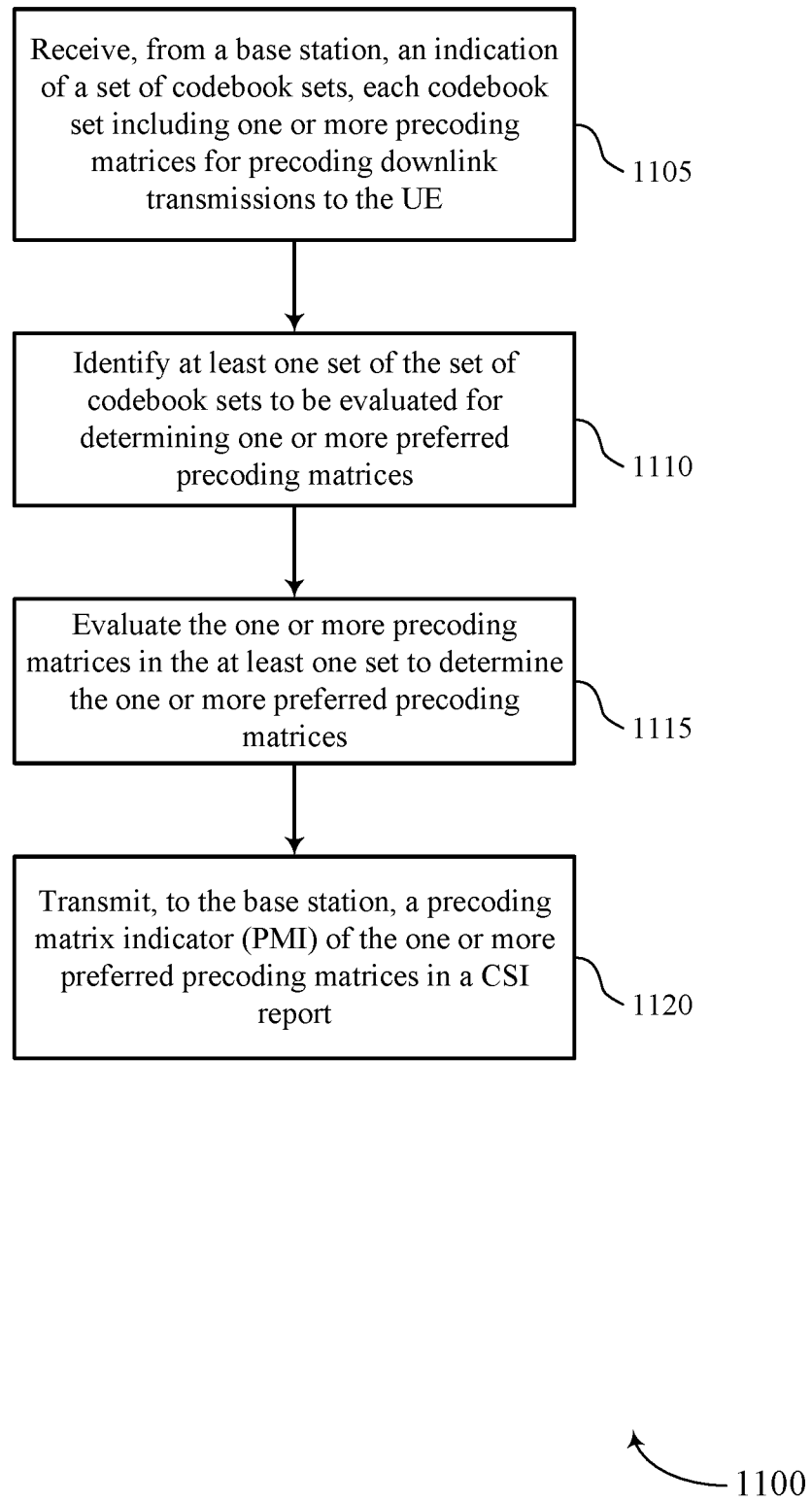
FIGS. 11 and 12 illustrate methods for codebook restriction and sub-sampling for CSI reporting in accordance with aspects of the present disclosure.

FIG. 11 shows a flowchart illustrating a method 1100 for codebook restriction and sub-sampling for CSI reporting in accordance with aspects of the present disclosure. The operations of method 1100 may be implemented by a UE 115 or its components as described herein. For example, the operations of method 1100 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may receive, from a base station, an indication of a plurality of codebook sets, each codebook set including one or more precoding matrices for precoding downlink transmissions to the UE. The operations of 1105 may be performed according to the methods described herein. In certain examples, aspects of the operations of 1105 may be performed by a codebook set manager as described with reference to FIGS. 5 through 7.

At 1110 the UE 115 may identify at least one set of the plurality of codebook sets to be evaluated for determining one or more preferred precoding matrices. The operations of 1110 may be performed according to the methods described herein. In certain examples, aspects of the operations of 1110 may be performed by a codebook set identifier as described with reference to FIGS. 5 through 7.

At 1115 the UE 115 may evaluate the one or more precoding matrices in the at least one set to determine the one or more preferred precoding matrices. The operations of 1115 may be performed according to the methods described herein. In certain examples, aspects of the operations of 1115 may be performed by a precoding matrix identifier as described with reference to FIGS. 5 through 7.

At 1120 the UE 115 may transmit, to the base station, a PMI of the one or more preferred precoding matrices in a CSI report. The operations of 1120 may be performed according to the methods described herein. In certain examples, aspects of the operations of 1120 may be performed by a CSI report manager as described with reference to FIGS. 5 through 7.

Figure 12:
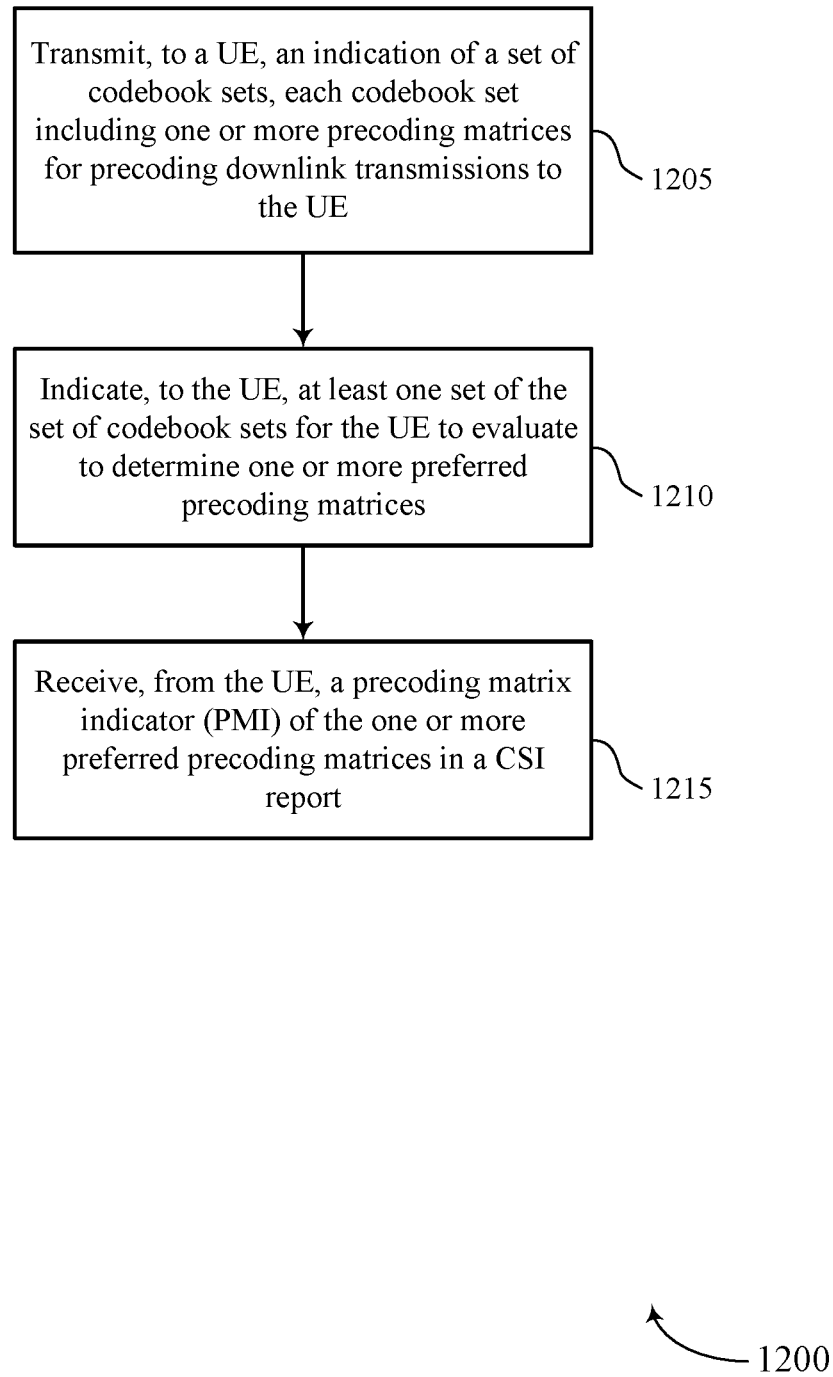

FIG. 12 shows a flowchart illustrating a method 1200 for codebook restriction and sub-sampling for CSI reporting in accordance with aspects of the present disclosure. The operations of method 1200 may be implemented by a base station 105 or its components as described herein. For example, the operations of method 1200 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1205 the base station 105 may transmit, to a user equipment (UE), an indication of a plurality of codebook sets, each codebook set including one or more precoding matrices for precoding downlink transmissions to the UE. The operations of 1205 may be performed according to the methods described herein. In certain examples, aspects of the operations of 1205 may be performed by a codebook set manager as described with reference to FIGS. 8 through 10.

At 1210 the base station 105 may indicate, to the UE, at least one set of the plurality of codebook sets for the UE to evaluate to determine one or more preferred precoding matrices. The operations of 1210 may be performed according to the methods described herein. In certain examples, aspects of the operations of 1210 may be performed by a codebook set indicator as described with reference to FIGS. 8 through 10.

At 1215 the base station 105 may receive, from the UE, a PMI of the one or more preferred precoding matrices in a CSI report. The operations of 1215 may be performed according to the methods described herein. In certain examples, aspects of the operations of 1215 may be performed by a CSI report manager as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a plurality of codebook sets, each codebook set including one or more precoding matrices for precoding downlink transmissions to the UE;
   receiving, from the base station, an indication of at least one codebook set of the plurality of codebook sets to be evaluated for determining one or more preferred precoding matrices;
   identifying, based at least in part on the indication of the at least one codebook set of the plurality of codebook sets, at least one set of the plurality of codebook sets to be evaluated for determining one or more preferred precoding matrices;
   evaluating the one or more precoding matrices in the at least one set to determine the one or more preferred precoding matrices; and
   transmitting, to the base station, a precoding matrix indicator (PMI) of the one or more preferred precoding matrices in a channel state information (CSI) report.

2. The method of claim 1, wherein receiving the indication of the at least one set of the plurality of codebook sets comprises:
   receiving a message indicating the at least one set of the plurality of codebook sets to be evaluated for determining the one or more preferred precoding matrices.

3. The method of claim 2, wherein the message includes downlink control information (DCI) that indicates the at least one set of the plurality of codebook sets.

4. The method of claim 1, wherein identifying the at least one set of the plurality of codebook sets comprises:
   determining the at least one set of the plurality of codebook sets based at least in part on one or more predetermined rules.

5. The method of claim 1, wherein receiving the indication of the at least one set of the plurality of codebook sets comprises receiving control information in a transmission time interval (TTI) that triggers the UE to transmit the CSI report; and
   wherein identifying the at least one set of the plurality of codebook sets comprises determining the at least one set based at least in part on an index of the TTI.

6. The method of claim 1, wherein identifying the at least one set of the plurality of codebook sets comprises:
   identifying a transmission time interval (TTI) in which to transmit the CSI report based at least in part on a configuration, at the UE, for periodic CSI reporting; and
   determining the at least one set based at least in part on an index of the TTI or on an index of the reference TTI.

7. The method of claim 1, wherein receiving the indication of the at least one set of the plurality of codebook sets comprises:
   receiving control information in a first transmission time interval (TTI) having a first duration that triggers the UE to transmit the CSI report, wherein the first TTI is within a second TTI having a second duration; and
   wherein identifying the at least one set of the plurality of codebook sets comprises determining the at least one set based at least in part on an index of the second TTI.

8. The method of claim 1, wherein identifying the at least one set of the plurality of codebook sets comprises:
   identifying a first transmission time interval (TTI) having a first duration in which to transmit the CSI report based at least in part on a configuration, at the UE, for periodic CSI reporting, wherein the first TTI is within a second TTI having a second duration; and
   determining the at least one set based at least in part on an index of the second TTI.

9. The method of claim 1, wherein identifying the at least one set of the plurality of codebook sets comprises:
   identifying a reference transmission time interval (TTI) to use to determine a TTI in which to transmit the CSI report based at least in part on a configuration, at the UE, for periodic CSI reporting, wherein the reference TTI comprises a first TTI having a first duration that is within a second TTI having a second duration; and
   determining the at least one set based at least in part on an index of the second TTI.

10. The method of claim 1, wherein receiving the indication of the at least one set of the plurality of codebook sets comprises receiving control information in a first transmission time interval (TTI) having a first duration that triggers the UE to transmit the CSI report, wherein the first TTI is within a second TTI having a second duration; and
    wherein identifying the at least one set of the plurality of codebook sets comprises determining the at least one set based at least in part on a first index of the first TTI and a second index of the second TTI.

11. The method of claim 1, wherein identifying the at least one set of the plurality of codebook sets comprises:
    identifying a first transmission time interval (TTI) having a first duration in which to transmit the CSI report based at least in part on a configuration, at the UE, for periodic CSI reporting, wherein the first TTI is within a second TTI having a second duration; and
    determining the at least one set based at least in part on a first index of the first TTI and a second index of the second TTI.

12. The method of claim 1, wherein identifying the at least one set of the plurality of codebook sets comprises:
    identifying a reference transmission time interval (TTI) to use to determine a TTI in which to transmit the CSI report based at least in part on a configuration, at the UE, for periodic CSI reporting, wherein the reference TTI comprises a first TTI having a first duration that is within a second TTI having a second duration; and
    determining the at least one set based at least in part on a first index of the first TTI and a second index of the second TTI.

13. The method of claim 1, wherein a number of precoding matrices within each of the plurality of codebook sets is based at least in part on an amount of time configured for the UE to generate and transmit CSI reports to the base station or on a periodicity with which the UE is configured to transmit the CSI reports to the base station.

14. The method of claim 1, wherein a number of precoding matrices within each of the plurality of codebook sets is based at least in part on a format of a control channel configured for the UE to use to transmit CSI reports to the base station.

15. A method for wireless communication at a base station, comprising:
    transmitting, to a user equipment (UE), an indication of a plurality of codebook sets, each codebook set including one or more precoding matrices for precoding downlink transmissions to the UE;

indicating to the UE, at least one set of the plurality of codebook sets for the UE to evaluate to determine one or more preferred precoding matrices; and receiving, from the UE, a precoding matrix indicator (PMI) of the one or more preferred precoding matrices in a channel state information (CSI) report.

16. The method of claim 15, wherein indicating the at least one set of the plurality of codebook sets comprises:
transmitting a message that includes downlink control information (DCI) indicating the at least one set of the plurality of codebook sets for the UE to evaluate to determine the one or more preferred precoding matrices.

17. The method of claim 15, wherein indicating the at least one set of the plurality of codebook sets comprises:
transmitting control information in a transmission time interval (TTI) that triggers the UE to transmit the CSI report, wherein an index of the TTI corresponds to the at least one set of the plurality of codebook sets.

18. The method of claim 15, wherein indicating the at least one set of the plurality of codebook sets comprises:
configuring the UE to transmit CSI reports periodically, wherein an index of a transmission time interval (TTI) to be used for transmitting the CSI report or an index of a reference TTI to be used to determine the TTI to be used for transmitting the CSI report corresponds to the at least one set of the plurality of codebook sets.

19. The method of claim 15, wherein indicating the at least one set of the plurality of codebook sets comprises:
transmitting control information in a first transmission time interval (TTI) having a first duration that triggers the UE to transmit the CSI report, wherein the first TTI is within a second TTI having a second duration, and wherein an index of the second TTI corresponds to the at least one set of the plurality of codebook sets.

20. The method of claim 15, wherein indicating the at least one set of the plurality of codebook sets comprises:
configuring the UE to transmit CSI reports periodically, wherein the UE is configured to transmit the CSI report in a first TTI having a first duration that is within a second TTI having a second duration, and wherein an index of the second TTI corresponds to the at least one set of the plurality of codebook sets.

21. The method of claim 15, wherein indicating the at least one set of the plurality of codebook sets comprises:
configuring the UE to transmit CSI reports periodically, wherein the UE is configured to determine a TTI in which to transmit the CSI report based at least in part on a reference TTI, and wherein an index of another TTI spanning the reference TTI corresponds to the at least one set of the plurality of codebook sets.

22. The method of claim 15, wherein indicating the at least one set of the plurality of codebook sets comprises:
transmitting control information in a first transmission time interval (TTI) having a first duration that triggers the UE to transmit the CSI report, wherein the first TTI is within a second TTI having a second duration, and wherein a first index of the first TTI and a second index of the second TTI corresponds to the at least one set of the plurality of codebook sets.

23. The method of claim 15, wherein indicating the at least one set of the plurality of codebook sets comprises:
configuring the UE to transmit CSI reports periodically, wherein the UE is configured to transmit the CSI report in a first TTI having a first duration that is within a second TTI having a second duration, and wherein a first index of the first TTI and a second index of the second TTI correspond to the at least one set of the plurality of codebook sets.

24. The method of claim 15, wherein indicating the at least one set of the plurality of codebook sets comprises:
configuring the UE to transmit CSI reports periodically, wherein the UE is configured to determine a TTI in which to transmit the CSI report based at least in part on a reference TTI, and wherein a first index of the reference TTI and a second index of another TTI spanning the reference TTI correspond to the at least one set of the plurality of codebook sets.

25. The method of claim 15, wherein a number of precoding matrices within each of the plurality of codebook sets is based at least in part on an amount of time configured for the UE to generate and transmit CSI reports to the base station, or on a periodicity with which the UE is configured to transmit the CSI reports to the base station, or on a format of a control channel configured for the UE to use to transmit the CSI reports to the base station.

26. A mobile device for wireless communication, comprising:
a processor;
memory in electronic communication with the processor; and
instructions stored in the memory and executable by the processor to cause the mobile device to:
receive, from a base station, an indication of a plurality of codebook sets, each codebook set including one or more precoding matrices for precoding downlink transmissions to the mobile device;
receiving, from the base station, an indication of at least one codebook set of the plurality of codebook sets to be evaluated for determining one or more preferred precoding matrices;
identify, based at least in part on the indication of the at least one codebook set of the plurality of codebook sets, at least one set of the plurality of codebook sets to be evaluated for determining one or more preferred precoding matrices;
evaluate the one or more precoding matrices in the at least one set to determine the one or more preferred precoding matrices; and
transmit, to the base station, a precoding matrix indicator (PMI) of the one or more preferred precoding matrices in a channel state information (CSI) report.

27. The mobile device of claim 26, wherein receiving the indication of the at least one set of the plurality of codebook sets comprises:
receiving a message that includes downlink control information (DCI) indicating the at least one set of the plurality of codebook sets to be evaluated for determining the one or more preferred precoding matrices.

28. The mobile device of claim 26, wherein receiving the indication of the at least one set of the plurality of codebook sets comprises receiving control information in a transmission time interval (TTI) that triggers the UE to transmit the CSI report; and
wherein identifying the at least one set of the plurality of codebook sets comprises determining the at least one set based at least in part on an index of the TTI.

29. The mobile device of claim 26, wherein identifying the at least one set of the plurality of codebook sets comprises:

identifying a transmission time interval (TTI) in which to transmit the CSI report based at least in part on a configuration, at the UE, for periodic CSI reporting; and determining the at least one set based at least in part on an index of the TTI or on an index of the reference TTI.

30. A network device for wireless communication, comprising:

a processor;

memory in electronic communication with the processor; and instructions stored in the memory and executable by the processor to cause the network device to:

transmit, to a user equipment (UE), an indication of a plurality of codebook sets, each codebook set including one or more precoding matrices for precoding downlink transmissions to the UE;

indicate, to the UE, at least one set of the plurality of codebook sets for the UE to evaluate to determine one or more preferred precoding matrices; and receive, from the UE, a precoding matrix indicator (PMI) of the one or more preferred precoding matrices in a channel state information (CSI) report.

* * * * *